(12) United States Patent
Loeb et al.

(10) Patent No.: US 8,272,278 B2
(45) Date of Patent: Sep. 25, 2012

(54) ENHANCEMENTS TO IMPROVE THE FUNCTION OF A BIOMIMETIC TACTILE SENSOR

(75) Inventors: Gerald E. Loeb, South Pasadena, CA (US); Nicholas Wettels, Los Angeles, CA (US); Jeremy Fishel, Long Beach, CA (US); Chia Hsien (Gary) Lin, Los Angeles, CA (US); Veronica J. Santos, Tempe, AZ (US); Raymond Peck, Long Beach, CA (US)

(73) Assignee: University of Southern California, Los Angeles, CA (US)

( * ) Notice: Subject to any disclaimer, the term of this patent is extended or adjusted under 35 U.S.C. 154(b) by 511 days.

(21) Appl. No.: 12/417,535

(22) Filed: Apr. 2, 2009

(65) Prior Publication Data

US 2009/0272201 A1 Nov. 5, 2009

Related U.S. Application Data

(63) Continuation-in-part of application No. 11/692,718, filed on Mar. 28, 2007, now Pat. No. 7,658,119, and a continuation-in-part of application No. 12/122,569, filed on May 16, 2008, now Pat. No. 7,878,075.

(60) Provisional application No. 61/041,861, filed on Apr. 2, 2008, provisional application No. 61/041,865, filed on Apr. 2, 2008, provisional application No. 61/041,867, filed on Apr. 2, 2008, provisional application No. 61/041,868, filed on Apr. 2, 2008, provisional application No. 61/042,182, filed on Apr. 3, 2008.

(51) Int. Cl.
*G01L 5/04* (2006.01)
*G01N 25/00* (2006.01)

(52) U.S. Cl. ..................... 73/862.46; 374/45

(58) Field of Classification Search .............. 374/45, 374/161; 73/461, 862.046, 468, 862.46
See application file for complete search history.

(56) References Cited

U.S. PATENT DOCUMENTS
4,014,217 A 3/1977 Lagasse et al.
(Continued)

FOREIGN PATENT DOCUMENTS
EP 1611841 A1 1/2006
(Continued)

OTHER PUBLICATIONS
International Search Report for PCT Application Serial No. PCT/US09/39354, mailed on May 28, 2009.
(Continued)

*Primary Examiner* — Lisa Caputo
*Assistant Examiner* — Jamel Williams
(74) *Attorney, Agent, or Firm* — McDermott Will & Emery LLP

(57) ABSTRACT

Tactile sensors are disclosed that mimic the human fingertip and its touch receptors. The mechanical components are similar to a fingertip, with a rigid core surrounded by a weakly conductive fluid contained within an elastomeric skin. The deformable properties of the finger pad can be used as part of a transduction process. Multiple electrodes can be mounted on the surface of the rigid core and connected to impedance measuring circuitry within the core. External forces deform the fluid path around the electrodes, resulting in a distributed pattern of impedance changes containing information about those forces and the objects that applied them. Strategies are described for extracting features related to the mechanical inputs and using this information for reflexive grip control. Controlling grip force in a prosthetic having sensory feedback information is described. Techniques are described for enhancing the useful force range for impedance sensors by internally texturing the elastomeric skin.

28 Claims, 13 Drawing Sheets

1) core
2) space
3) soluble keeper
4) tube
5) flex circuit
6) electrodes
7) connection pads
8) strain relief
9) conditioning circuits
10) pressure sensor
11) housing
12) inlet channel
13) reference channel
14) cap
15) thermistor
16) skin
17) ridges
18) asperities
19) plate w/mounts
20) collar
21) shrinking band
22) plate
23) screw
24) threaded insert
25) hole
26) hypodermic needle

U.S. PATENT DOCUMENTS

| Patent | | Date | Inventor |
|---|---|---|---|
| 4,306,148 | A | 12/1981 | Ringwall et al. |
| 4,481,815 | A | 11/1984 | Overton |
| 4,492,949 | A | 1/1985 | Peterson et al. |
| 4,521,685 | A | 6/1985 | Rebman |
| 4,526,043 | A | 7/1985 | Boie et al. |
| 4,555,953 | A | 12/1985 | Dario et al. |
| 4,555,954 | A | 12/1985 | Kim |
| 4,574,438 | A | 3/1986 | Diepers et al. |
| 4,581,491 | A | 4/1986 | Boothroyd |
| 4,584,625 | A | 4/1986 | Kellogg |
| 4,616,511 | A | 10/1986 | Gindy et al. |
| 4,621,533 | A | 11/1986 | Gindy |
| 4,634,917 | A | 1/1987 | Dvorsky et al. |
| 4,640,137 | A | 2/1987 | Trull et al. |
| 4,694,231 | A | 9/1987 | Alvite |
| 4,709,342 | A | 11/1987 | Hosoda et al. |
| 4,712,037 | A | 12/1987 | Verbeek et al. |
| 4,715,235 | A | 12/1987 | Fukui et al. |
| 4,745,812 | A | 5/1988 | Amazeen et al. |
| 4,747,313 | A | 5/1988 | Okada |
| 4,813,732 | A | 3/1989 | Klem |
| 4,814,562 | A | 3/1989 | Langston |
| 4,817,440 | A | 4/1989 | Curtin |
| 4,866,412 | A | 9/1989 | Rzepczynski |
| 4,886,361 | A | 12/1989 | Furstenau |
| 4,945,305 | A | 7/1990 | Blood |
| 4,964,302 | A | 10/1990 | Grahn et al. |
| 4,980,646 | A | 12/1990 | Zemel |
| 5,010,774 | A | 4/1991 | Kikuo et al. |
| 5,014,224 | A | 5/1991 | Hans |
| 5,033,291 | A | 7/1991 | Podoloff et al. |
| 5,060,527 | A | 10/1991 | Burgess |
| 5,138,216 | A | 8/1992 | Woodruff et al. |
| 5,193,539 | A | 3/1993 | Schulman et al. |
| 5,193,540 | A | 3/1993 | Schulman et al. |
| 5,200,679 | A | 4/1993 | Graham |
| 5,209,126 | A | 5/1993 | Grahn |
| 5,225,959 | A | 7/1993 | Stearns |
| 5,237,879 | A | 8/1993 | Speeter |
| 5,255,345 | A | 10/1993 | Shaefer |
| 5,261,266 | A | 11/1993 | Lorenz et al. |
| 5,311,779 | A | 5/1994 | Teruo |
| 5,312,439 | A | 5/1994 | Loeb |
| 5,313,840 | A | 5/1994 | Chen et al. |
| 5,324,316 | A | 6/1994 | Schulman et al. |
| 5,373,747 | A | 12/1994 | Ogawa et al. |
| 5,405,367 | A | 4/1995 | Schulman et al. |
| 5,501,498 | A | 3/1996 | Ulrich |
| 5,510,812 | A | 4/1996 | O'Mara et al. |
| 5,563,354 | A | 10/1996 | Kropp |
| 5,604,314 | A * | 2/1997 | Grahn ............................. 73/628 |
| 5,744,953 | A | 4/1998 | Hansen |
| 5,760,530 | A | 6/1998 | Kolesar |
| 5,871,248 | A | 2/1999 | Okogbaa et al. |
| 5,886,615 | A | 3/1999 | Burgess |
| 5,905,430 | A | 5/1999 | Yoshino et al. |
| 5,905,485 | A | 5/1999 | Podoloff |
| 5,953,683 | A | 9/1999 | Hansen et al. |
| 5,965,880 | A | 10/1999 | Wolf et al. |
| 5,983,725 | A | 11/1999 | Fischer et al. |
| 6,003,390 | A | 12/1999 | Cousy |
| 6,007,728 | A | 12/1999 | Liu et al. |
| 6,067,862 | A | 5/2000 | Murray et al. |
| 6,154,580 | A | 11/2000 | Kuriyama et al. |
| 6,163,739 | A | 12/2000 | Park et al. |
| 6,175,764 | B1 | 1/2001 | Loeb et al. |
| RE37,065 | E | 2/2001 | Grahn |
| 6,188,331 | B1 | 2/2001 | Zee et al. |
| 6,231,520 | B1 | 5/2001 | Maezawa |
| 6,286,226 | B1 | 9/2001 | Jin |
| 6,400,139 | B1 | 6/2002 | Khalfin et al. |
| 6,443,509 | B1 | 9/2002 | Levin et al. |
| 6,445,284 | B1 | 9/2002 | Cruz-Hernandez et al. |
| 6,528,991 | B2 | 3/2003 | Ashe |
| 6,529,122 | B1 | 3/2003 | Magnussen et al. |
| 6,584,217 | B1 | 6/2003 | Lawless et al. |
| 6,593,756 | B1 | 7/2003 | Schmidt et al. |
| 6,622,575 | B1 | 9/2003 | Nagata |
| 6,624,626 | B2 | 9/2003 | Khalfin |
| 6,690,963 | B2 | 2/2004 | Ben-Haim et al. |
| 6,769,313 | B2 | 8/2004 | Weiss |
| 6,848,320 | B2 | 2/2005 | Miyajima et al. |
| 6,871,395 | B2 | 3/2005 | Scher et al. |
| 6,886,415 | B1 | 5/2005 | Kurogi et al. |
| 6,888,537 | B2 | 5/2005 | Benson et al. |
| 6,898,299 | B1 | 5/2005 | Brooks |
| 6,915,701 | B1 | 7/2005 | Tarler |
| 6,955,094 | B1 | 10/2005 | Tarler |
| 6,996,456 | B2 | 2/2006 | Cordell et al. |
| 7,004,039 | B1 | 2/2006 | Ford et al. |
| 7,006,895 | B2 | 2/2006 | Green |
| 7,016,560 | B2 | 3/2006 | Ticknor et al. |
| 7,066,376 | B2 | 6/2006 | Scher et al. |
| 7,069,791 | B2 | 7/2006 | Hashimoto et al. |
| 7,103,447 | B2 | 9/2006 | Di Profio et al. |
| 7,107,124 | B2 | 9/2006 | Green |
| 7,112,755 | B2 | 9/2006 | Kitano et al. |
| 7,198,908 | B2 | 4/2007 | Ochi et al. |
| 7,209,028 | B2 | 4/2007 | Boronkay et al. |
| 7,324,872 | B2 | 1/2008 | Nagasaka |
| 7,347,110 | B1 | 3/2008 | Chen et al. |
| 7,357,035 | B2 | 4/2008 | Liu et al. |
| 7,361,919 | B2 | 4/2008 | Setlak |
| 7,366,332 | B2 | 4/2008 | Shimamura et al. |
| 7,367,232 | B2 | 5/2008 | Vaganov et al. |
| 7,373,843 | B2 | 5/2008 | Ganapathi et al. |
| 7,658,119 | B2 | 2/2010 | Loeb et al. |
| 7,762,956 | B2 | 7/2010 | Ozaki et al. |
| 7,777,137 | B2 | 8/2010 | Ahn et al. |
| 7,878,075 | B2 | 2/2011 | Johansson et al. |
| 2003/0051561 | A1 | 3/2003 | Weiss |
| 2003/0158487 | A1 | 8/2003 | Thede et al. |
| 2004/0187071 | A1 | 9/2004 | Zhang et al. |
| 2005/0021154 | A1 | 1/2005 | Brimalm |
| 2005/0134562 | A1 | 6/2005 | Grant et al. |
| 2005/0234292 | A1 | 10/2005 | Faulkner et al. |
| 2005/0239191 | A1 | 10/2005 | Prins |
| 2005/0253206 | A1 | 11/2005 | Bureau et al. |
| 2006/0010090 | A1 | 1/2006 | Brockway et al. |
| 2006/0014912 | A1 | 1/2006 | Araki et al. |
| 2006/0115348 | A1 * | 6/2006 | Kramer ............................. 414/5 |
| 2006/0161225 | A1 | 7/2006 | Sormann et al. |
| 2006/0175770 | A1 | 8/2006 | Linzell |
| 2007/0060815 | A1 | 3/2007 | Martin et al. |
| 2007/0207903 | A1 | 9/2007 | Csabai |
| 2007/0227267 | A1 * | 10/2007 | Loeb et al. ............... 73/862.046 |
| 2007/0265515 | A1 | 11/2007 | Brister et al. |
| 2009/0133508 | A1 | 5/2009 | Johansson et al. |
| 2009/0241954 | A1 | 10/2009 | Karlsson |
| 2010/0139418 | A1 | 6/2010 | Loeb et al. |

FOREIGN PATENT DOCUMENTS

| | | |
|---|---|---|
| EP | 1626331 A2 | 2/2006 |
| EP | 1633248 A1 | 3/2006 |
| EP | 2010868 A2 | 1/2007 |
| EP | 1835380 A1 | 9/2007 |
| EP | 1835552 A1 | 9/2007 |
| EP | 1901048 A2 | 3/2008 |
| EP | 1942323 A1 | 7/2008 |
| EP | 2158454 A2 | 3/2010 |
| WO | 0026626 A1 | 5/2000 |
| WO | WO 2004112609 A1 | 12/2004 |
| WO | 2007126854 A2 | 11/2007 |
| WO | 2009023334 A9 | 2/2009 |
| WO | 2009124209 A1 | 10/2009 |
| WO | 2009124211 A1 | 10/2009 |

OTHER PUBLICATIONS

International Search Report for PCT Application Serial No. PCT/US09/39357, mailed on May 29, 2009.

Dario P. et al. Ferroelectric polymer tactile sensors with anthropomorphic features. Proceedings IEEE International Conference on Robotics and Automation, Washington DC, 1:332-340, 1984.

Howe R.D. et al. Sensing skin acceleration for texture and slip perception. Proceedings IEEE International Conference on Robotics and Automation, Scotsdale, AZ, 1:145-150, 1989.

Howe R.D. et al. Dynamic tactile sensing: perception of fine surface features with stress rate sensing. IEEE Transactions on Robotics and Automation, 9(2):140:151, 1993.

Johansson R.S. et al. Responses of mechanoreceptive afferent units in the glabrous skin of the human hand to sinusoidal skin displacements. Brain Research, 244(1):17-25, 1982.

Johnson K.O. Neural mechanisms of tactual form and texture discrimination, Annual Review Neuroscience, 15:277-50, 1992. Howe R., Tactile Sensing and Control of Robotic Manipulation. Journal of Advanced Robotics, 8(3):245-261, 1994.

Mountcastle V.B. et al. Detection thresholds for stimuli in humans and monkeys: comparison with threshold events in mechanoreceptive afferent nerve fibers innervating the monkey hand. Journal of Neurophysiology, 35:122-136, 1972.

Son J.S. et al. A tactile sensor for localizing transient events in manipulation. Proceedings of IEEE International Conference on Robotics and Automation, 1:471-476, 1994.

Westling G. et al. Factors influencing the force control during precision grip. Experimental Brain Research, 53(2):277-84,1984.

Yamada Y. et al. Tactile sensor with three-axis force and vibration sensing functions and its application to detect rotational slip. Proceedings IEEE International Conference on Robotics and Automation, San Diego, 4:3550-3557, 1994.

Brockett, R.W. Robotic Hands With Rheological Surfaces. Proceedings of the IEEE Conference on Robotics and Automaton, Philadelphia, PA, pp. 942-946 (1985).

Grupen R.A., et al. A Survey of General-Purpose Manipulation The International Journal of Robotics Research; 8; 38 (1989).

Howe, R.D. Tactile Sensing and Control of Robotic Manipulation. In Journal of Advanced Robotics, vol. 8, No. 3, pp. 1-30 (1994).

Hristu, D. et al. The performance of a deformable membrane tactile sensor: basic results on geometrically-defined tasks. Proc of the IEEE International Conference on Robotics & Automation San Francisco, CA (2000).

Melchiorri, C. Tactile Sensing for Robotic Manipulation. in Ramsete: Lecture Notes in Control and Information Sciences vol. 270, pp. 75-102, Springer Berlin (2001).

Russell, R. A. A Tactile Sensor Skin for Measuring Surface Contours. in: Proc. IEEE Region 10 Int. Conf. on Technology Enabling Tomorrow: Computers, Communications and Automation towards the 21st Century, Melbourne, pp. 262-266 (1992).

Shimojo, M. et al. A Tactile Sensor Sheet Using Pressure Conductive Rubber With Electrical-Wires Stitched Method. IEEE Sensor Journal, vol. 4, No. 5, pp. 589-596, (2004).

Yamada, Y. et al. Tactile Sensor with 3-Axis Force and Vibration Sensing Functions and Its Application to Detect Rotational Slip. Proc of International Conference on Robotics and Automation, pp. 3550-3557, San Diego, CA (1994).

Beccai, L. Design and fabrication of a hybrid silicon three-axial force sensor for biomechanical applications Sensors and Actuators A: Physical. vol. A120, No. 2: 370-382. May 17, 2005.

Beebe, D. et al. A silicon force sensor for robotics and medicine. Sensors and Actuators A 50:55-65, 1995.

Birznieks, I., et al. Encoding of direction of fingertip forces by human tactile afferents. Journal of Neuroscience. 21:8222-8237, 2001.

Bloor, D. et al. A metal-polymer composite with unusual properties. Journal of Physics D: Applied Physics, 38: 2851-2860, 2005.

Butterfass, J. et al. DLR-Hand II: Next generation of a dexterous robot hand. Proceedings of the IEEE International Conference on Robotics and Automation. pp. 109-114, 2001.

Cameron, T. et al, Micromodular implants to provide electrical stimulation of paralyzed muscles and limbs, IEEE Trans Biomed Eng 1997; 44: pp. 781-790.

Cole, K.J. et al. Friction at the digit-object interface scales the sensory-motor transformation for grip responses to pulling loads. Experimental Brain Research, 95:523-532, 1993.

Dalmia, A. et al. Electrochemical behavior of gold electrodes modified with self-assembled monolayers with an acidic end group for selective detection of dopamine. Journal of Electrochemistry, 430: 205-214, 1997.

Falcon, C. Inside implantable Devices. Medical Design Technology, Oct. 2004. pp. 24-27.

Flanagan J.R., et al. Control of Fingertip Forces in Multi-Digit Manipulation. Journal of Neurophysiology. 81:1706-1717, 1999.

Gordon, A. et al. Memory representation underlying motor commands used during manipulation of common and novel objects, Journal of Neurophysiology 69: 1789-1796, 1993.

Gudnason, G. et al. A chip for an implantable neural stimulator. Analog Integrated Circuits and Signal processing 22 (1999), pp. 81-89.

Gudnason, G. et al. A distributed transducer system for functional electrical stimulation. Proc. ICECS, Malta, vol. 1, (2001) pp. 397-400.

Helsel, M et al. An impedance tomographic tactile sensor. Sensor and Actuators. vol. 14, No. 1, pp. 93-98. 1988.

Hornik, K. et al. Multilayer feed forward networks are universal approximators. Neural Networks, 2(5):359-366, 1989.

International Search Report for PCT Application Serial No. PCT/US07/07631, mailed on Jun. 3, 2008.

International Search Report for PCT Application Serial No. PCT/US08/63985, mailed on Jan. 16, 2009.

Johansson, R.S. et al. Roles of glabrous skin receptors and sensorimotor memory in automatic control of precision grip when lifting rougher or more slippery objects. Experimental Brain Research. 56:550-564, 1984.

Johansson, R.S. et al. Signals in tactile afferents from the fingers eliciting adaptive motor responses during precision grip. Experimental Brain Research. 66:141-154, 1987.

Johansson, R.S. et al. Somatosensory control of precision grip during unpredictable pulling loads. I Changes in loads force amplitude, Experimental Brain Research 89: 181-191, 1992.

Johansson, R.S. et al. Somatosensory control of precision grip during unpredictable pulling loads. II Changes in load force rate, Experimental Brain Research 89: 192-203, 1992.

Johansson, R.S. et al. First spikes in ensembles of human tactile afferents code complex spatial fingertip events. Nature Neuroscience 7:170-177, 2004.

Kaliki, .RR. et al. The Effects of Training Set on Prediction of Elbow Trajectory from Shoulder Trajectory during Reaching to Targets. 28th Annual International conference IEEE Engineering in Medicine and Biological Society (EMBS), pp. 5483-5486.

Kenaley, G. et al. Electrorheological Fluid-Based Robotic Fingers with Tactile Sensing. Proceedings of IEEE International Conference on Robotics and Automation 1:132-136, 1989.

Lee, M.H. et al. Tactile sensing for mechatronics—a state of the art survey. Mechatronics 9:1-31 1999.

Lee, S.Y. An implantable wireless bidirectional communication microstimulator for neuromuscular stimulation. IEEE Transactions on circuits and systems, vol. 52, Dec. 2005, pp. 2526-2538.

Lee, Y.K. et al. Mechanical properties of calcium phosphate based dental filling and regeneration materials Journal of Oral Rehabilitation 30; 418-425, 2003.

Liu, W. et al. A Neuro-Stimulus Chip with Telemetry Unit for Retinal Prosthetic Device. IEEE Journal of Solid-State Circuits, vol. 35 Oct. 2000, pp. 1487-1497.

Loeb, G.E. et al. Design and fabrication of an experimental cochlear prosthesis. Med. & Biol. Engng. & Comput. 21:241-254, 1983.

Loeb, G.E. et al. Microminiature molding techniques for cochlear electrode arrays. J. Neurosci. Meth. 63:85:92, 1995.

Loeb, G. E. et al. The Motor Unit and Muscle Action. Principles of Neural Science, 4th Ed Mc Graw Hill 2000, Chapter 34, pp. 674-694.

Loeb. G. E. et al. BION Injectable Interfaces with Peripheral Nerves and Muscles. Neurosurgical Focus, vol. 20, May 2006, pp. 1-9.

Mei, T. et al. An integrated MEMS three-dimensional tactile sensor with large force range. Sensor and Actuators 80:155-162, 2000.

Merrill, D. et al. Electrical stimulation of excitable tissue: design of efficacious and safe protocols. Journal of Neuroscience Methods, 141: 171-198, 2005.

Mukaibo, Y. et al. Development of a texture sensor emulating the tissue structure and perceptual mechanism of human fingers. Proc. of the 2005 IEEE International Conference on Robotics and Automation, pp. 2576-2581, 2005.

Piela, B. et al. Capacitance of the gold electrode in 0.5 M sulfuric acid solution: AC impedance studies. Journal of Electrochemistry, 388: 69-79, 1994.

Russell et al. Sensing Surface Shape by Touch. Robotics and Automation, 1993. Proceedings., 1993 IEEE International Conference on. May 2-6, 1993, pp. 423-428 vol. 1.

Sachs, N.A. et al. Development of a BIONic Muscle Spindle for Prosthetic Proprioception. IEEE Trans. Biomedical Engineering, vol. 54, No. 6, Jun. 2007, pp. 1031-1041.

Sivard, A. et al. Challenges of in-body communications. Embedded Systems Europe, Mar. 2005, pp. 34-37.

Suaning, G.J. et al. CMOS Neurostimulation ASIC with 100 Channels, Scaleable Output and Bidirectional Radio-Frequency; Telemetry. IEEE Transactions on Biomedical Engineering, vol. 48, Feb. 2001, pp. 248-260.

Tan, W. et al. Feasibility of Prosthetic Posture Sensing Via Injectable Electronic Modules. IEEE Trans. Neural Systems & Rehab. Engineering, vol. 15, No. 2, Jun. 2007, pp. 295-309.

Vasarhelyi, G. et al. Effects of the elastic cover on tactile sensor arrays. Sensors and Actuators 132:245-251, 2006.

Voyles, R. et al. Design of a modular tactile sensor and actuator based on an electrorheological gel. Proceedings of IEEE International Conference on Robotics and Automation 1:13-17, 1989.

Westling, G. et al. Responses in glabrous skin mechanoreceptors during precision grip in humans. Experimental Brain Research. 66:128-140, 1987.

Yamada, D. et al. Artificial Finger Skin having ridges and distributed tactile sensors used for grasp force control, Proc. IEEE/RSJ International Conference on Intelligent Robots and Systems, pp. 686-691, 2001.

Zou, Q. et al. Single- and Triaxis Piezoelectric-Bimorph Accelerometer. IEEE/ASME Journal of Microelectromechanical Systems, vol. 17, No. 1, Feb. 2008, pp. 45-57.

Notice of Allowance, dated Apr. 2, 2012, for U.S. Appl. No. 12/417,532, filed Apr. 2, 2009, entitled "Measurement of Sliding Friction-Induced Vibrations for Biomimetic Tactile Sensing," Gerald E. Loeb, inventor, published Jun. 10, 2010 as US 2010/0139418 A1.

Charlton, S. et al. 2002. Extracting Contact Parameters from Tactile Data Using Artificial Neural Networks. In Systems, Man and Cybernetics, 1995, Intelligent Systems for the 21st Century, IEEE International Conference on, Oct. 22-25, 1995., pp. 3954-3959. Published Aug. 6, 2002.

DML. 2002. Telemanipulation—Dexterous Manipulation Laboratory: Ongoing Research: Tactile Sensing. Mar. 22, 2002. <http://www-cdr.stanford.edu/DML/tele_projects/res_tacsens.htm>.

Extended European Search Report, dated Aug. 16, 2011, for European Application No. 07754188.6, entitled "Biomimetic Tactile Sensor," filed Mar. 28, 2007 (PCT Filing date), Published Jan. 7, 2009 as EP2010868A2 (based on WO2007/126854 A1).

Extended European Search Report, dated Oct. 21, 2011, for European Application No. 08827237.2, entitled "Biomimetic Tactile Sensor for Control of Grip," filed May 16, 2008 (PCT Filing date), Published Mar. 3, 2010 as EP2158454A2 (based on WO2009/023334 A1).

Fishel, J.A. et al. 2008. A Robust Micro-Vibration Sensor for Biomimetic Fingertips. In Proceedings of the 2nd Biennial IEEE/RAS-EMBS International Conference on Biomedical Robotics and Biomechatronics, Scottsdale, AZ, USA, Oct. 19-22, 2008, pp. 659-663.

Kageyama, R. et al. 1999. Development of Soft and Distributed Tactile Sensors and the Application to a Humanoid Robot. In Systems, Man, and Cybernetics, 1999. IEEE SMC '99 Conference Proceedings. 1999 IEEE International Conference on. 1999, pp. 981-986, vol. 2.

Son, J.S. et al. 1994. A Tactile Sensor for Localizing Transient Events in Manipulation. Robotics and Automation, 1994, Proceedings, 1994 IEEE International Conference on, May 8-13, 1994, vol. 1.

Son, J.S. et al. 2002. Comparison of Contact Sensor Localization Abilities During Manipulation. In Intelligent Robots and Systems 95, Human Robot Interaction and Cooperative Robots, Proceedings, 1995 IEE, RSJ International Conference on, Aug. 5-9, 1995, pp. 96-103, vol. 2. Published Aug. 6, 2002.

Tremblay, M.R. et al. 1993. Estimating Friction Using Incipient Slip Sensing During a Manipulation Task. In Proceedings of the 1993 International Conference on Robotics and Automation, pp. 429-434. (Online at <http://ieeexplore.ieee.org/xpls/abs_all.jsp?arnumber=292018&tag=1>.

Worth, A.J. et al. 1992. A Neural network for Tactile Sensing: The Hertzian Contact Problem. In IEEE Transactions on Systems, Man, and Cybernetics, vol. 22, No. 1, Jan./Feb. 1991, pp. 177-182.

Office Action, dated Nov. 15, 2011, for U.S. Appl. No. 12/417,532, filed Apr. 2, 2009, entitled "Measurement of Sliding Friction-Induced Vibrations for Biomimetic Tactile Sensing," published Jun. 10, 2010, as US 2010-0139418A1.

* cited by examiner 6 electrodes
10 pressure sensor
205 vibration sensing subsystem
210 pressure sensing subsystem
215 multiplexer
220 reference resistor
225 reference voltage
230 microcontroller
235 AC temperature system
240 DC temperature subsystem

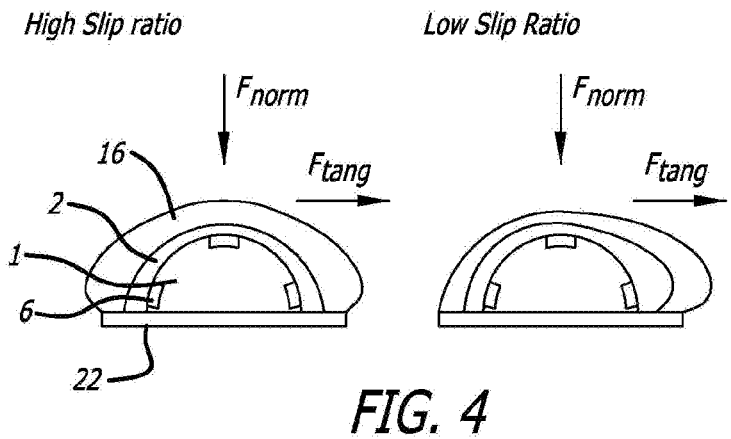
FIG. 4
FIG. 5A
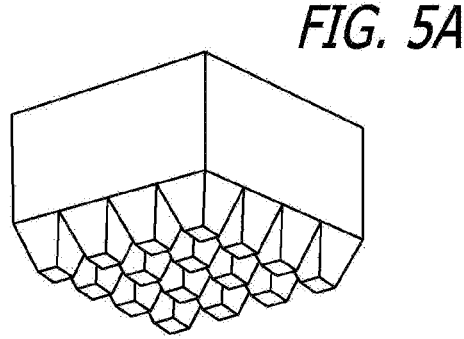
2 space
6 electrodes
16 skin
FIG. 5B
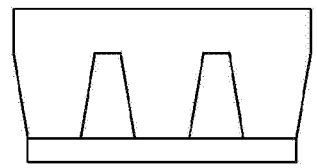
18 asperities
30 External Force
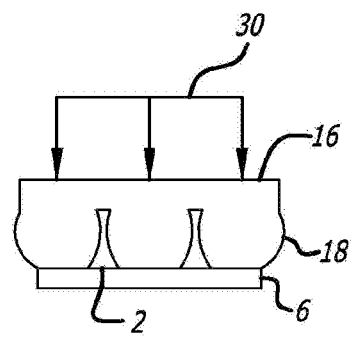
FIG. 5C

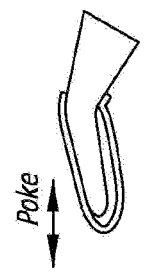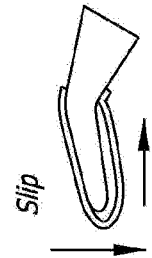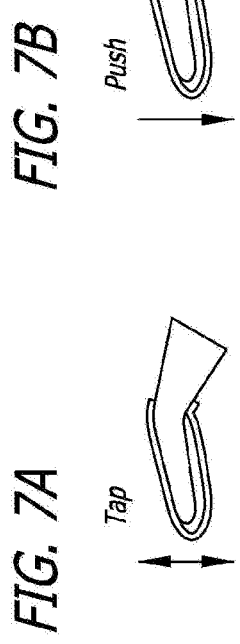
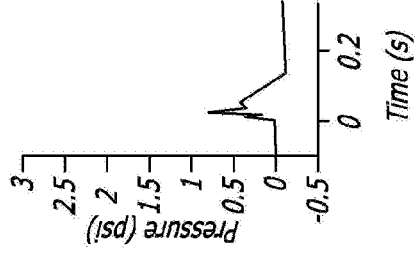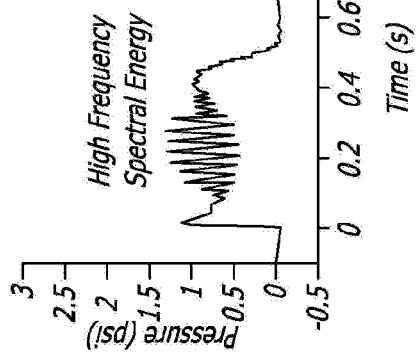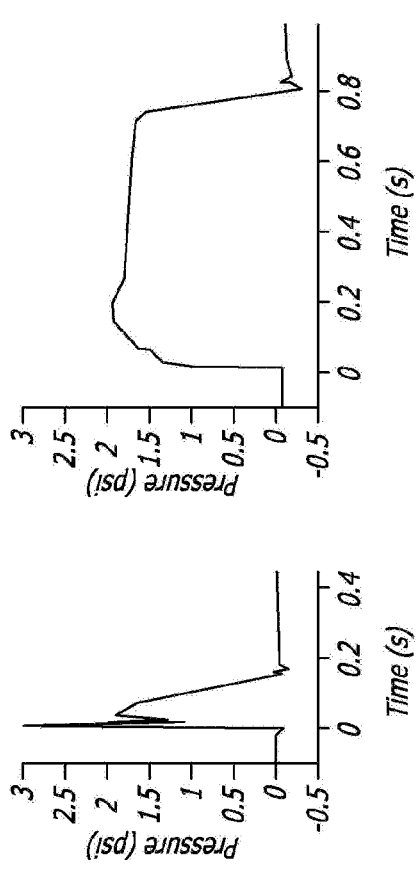
FIG. 7A  Tap
FIG. 7B  Push
FIG. 7C  Slip
FIG. 7D  Poke

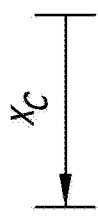
FIG. 9A
Fingerprint Stick
(No Stored Energy)
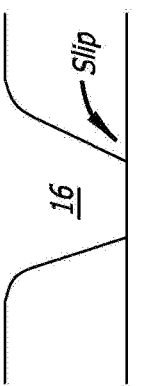
Stick
Contacted Object
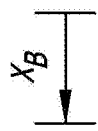
FIG. 9B
Fingerprint Stick
(Stored Energy)
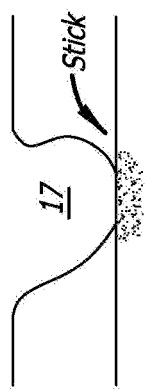
Stick
Contacted Object
$X_A < X_B < X_C$
FIG. 9C
Fingerprint Stick
(Released Energy)
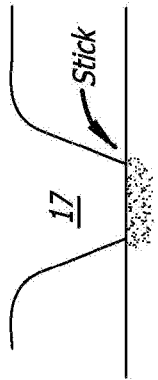
Slip
Contacted Object

ENHANCEMENTS TO IMPROVE THE FUNCTION OF A BIOMIMETIC TACTILE SENSOR

CROSS-REFERENCE TO RELATED APPLICATIONS

This application is a continuation-in-part of U.S. patent application Ser. No. 11/692,718, filed 28 Mar. 2007 (now U.S. Pat. No. 7,658,119, issued Feb. 9, 2010), and entitled "Biomimetic Tactile Sensor," which claims priority to U.S. Provisional Patent Application No. 60/786,607, filed 28 Mar. 2006 and entitled "Biomimetic Tactile Sensor"; the entire contents of both of which applications are incorporated herein by reference. This application is also a continuation-in-part of U.S. patent application Ser. No. 12/122,569 filed 16 May 2008, (now U.S. Pat. No. 7,878,075, issued Feb. 1, 2011), and entitled "Biomimetic Tactile Sensor for Control of Grip," which claims priority to U.S. Provisional Patent Application No. 60/939,009, filed 18 May 2007 and entitled "Biomimetic Tactile Sensor for Control of Grip"; the entire contents of both of which applications are incorporated herein by reference. This application also claims the benefit of the following applications, all of which, and all references cited therein, are incorporated in their entireties herein by reference: U.S. Provisional Patent Application No. 61/041,861, filed 2 Apr. 2008 and entitled "Wearable Measurement System for Shoulder Motion"; U.S. Provisional Patent Application No. 61/041,865, filed 2 Apr. 2008 and entitled "Hand Motion Commands Inferred from Voluntary Shoulder Movement"; U.S. Provisional Patent Application No. 61/041,867, filed 2 Apr. 2008 and entitled "Measurement of Sliding Friction-Induced Vibration for Tactile Feedback Control"; U.S. Provisional Patent Application No. 61/041,868, filed 2 Apr. 2008 and entitled "Elastomer Patterning and Pressure Sensing Enhancements for Functional Transduction in Electro-Hydraulic Impedance Sensing Devices"; and, U.S. Provisional Patent Application No. 61/042,182, filed 3 Apr. 2008 and entitled "Spike-Like Regulator".

STATEMENT REGARDING FEDERALLY SPONSORED RESEARCH

This invention was made with government support under Grant No. EEC 0310723, awarded by the National Science Foundation. The government has certain rights in the invention.

BACKGROUND OF THE DISCLOSURE

1. Field of the Disclosure

This application relates generally to devices and methods to provide tactile sensory information from robotic or prosthetic finger tips comparable to the tactile sensing provided by human skin.

2. General Background and State of the Art

Present generations of robots lack most of the tactile sensorial abilities of humans. This limitation prevents industrial robots from being used to carry on delicate tasks of enormous practical relevance (such as assembly operations and handling of fragile objects) and, even more, it prevents the development of next-generation robots for off-factory jobs (agriculture, home, assistance to the disabled, etc.). Future generations of robots will need to make use of a wide variety of sensors and perceptual algorithms to identify and interact with objects and surfaces in the external world, particularly in environment that are less structured than those in which industrial robots are used now. Taction, vision, and proximity are the sensory needs that, in combination or alone, are commonly accepted as desirable features of robots. Research on visual pattern recognition received considerable attention in recent years. Tactile recognition (the ability to recognize objects by manipulation) is an inherently active process. Unlike visual sensors (passive and located remotely from the object), tactile sensors can be put in contact with the object to extract information about and, even more, such contact should be competently organized in order to extract the maximum degree of information from manipulative acts.

Humans who have suffered amputations of their hands and arms are generally provided with prosthetic limbs. Increasingly these prosthetics incorporate electromechanical actuators to operate articulations similar to biological joints, particularly to control the fingers to grasp and hold objects. Recent research has revealed how arrays of biological tactile receptors distributed throughout the soft tissues of the human finger tip are used normally by the nervous system to provide rapid adjustments of grip force when incipient slip is detected. Due to limitations in currently available tactile sensing technology discussed below, currently available prosthetic fingers provide little or no sensing capabilities and cannot make use of these highly effective biological control strategies.

Engineered tactile sensors detecting mechanical stimuli can be grouped into a number of different categories depending upon their construction. The most common groups are piezoresistive, piezoelectric, capacitive and elastoresistive structures. The common feature of all of these devices is the transduction of mechanical strains or deformations into electrical signals. Tactile sensors are commonly used in the field of robotics and in particular with those robotic devices that pick up and place objects in accordance with programmed instructions; the so-called "pick and place" class of robot. Unfortunately, while it would be desirable for the above-listed groups of tactile sensors to respond in much the same way that the human finger does, many of them can provide only limited information about contact with an object whose position, orientation and mechanical properties are highly predictable. More generalized sensing requires a multiplicity of sensors and extensive electrical connections and signal processing circuitry. It is difficult to integrate these components into the tactile surfaces of manipulators, which are often required to have contoured, compliant surfaces to facilitate handling of various objects. In order to achieve the requisite sensitivity, the individual sensors tend to be relatively fragile and subject to mechanical damage over the wide dynamic range of forces to which they may be exposed. The large number of electrical connections between sensors and signal processing circuitry tend to be difficult and expensive to assemble, difficult to protect from environmental hazards such as water and grit, and difficult or impossible to repair if damaged.

A wide variety of technologies have been applied to solve the tactile sensing problem in robotics and medicine. Transduction mechanisms such as optics, capacitance, piezoresistance, piezoelectricity, ultrasound, conductive polymers, etc. have all yielded viable solutions for detecting either normal pressure distributions, shear forces, or dynamic friction-induced vibrations but have required sensitive and fragile transducers to reside close to the contact surface to accurately detect these events. For example, most micro-electromechanical system ("MEMS") sensors provide good resolution and sensitivity, but lack the robustness for many applications outside the laboratory.

Sensing of friction-induced vibrations has been a particular challenge in the development of tactile sensors. These vibrations arise when a compliant sensor is stroked across a surface at some velocity. When this occurs, the power transferred into the skin by friction gives rise to acoustic vibrations in the skin and pulp of the finger. The biological finger takes advantage of this phenomenon and has specialized sensors to detect these vibrations, which play an important role in slip-detection for reflexive grip-control. Many attempts to develop a sensor capable of measuring such small vibrations have been made (Howe, Cutkosky, Dario), but they have required fragile dynamic sensors residing very close to the contact surface to achieve the needed sensitivity. In this location fragile sensing devices are at a high risk for damage and experience short lifetimes and expensive repair costs.

The curved, deformable nature of biological finger tips provides mechanical features that are important for the manipulation of the wide variety of objects encountered naturally. Many tactile sensing arrays have been fabricated using MEMS but they are not suitable for mounting on such surfaces or for use in environments that include heavy loads, dust, fluids, sharp edges and wide temperature swings. If skin-like elastic coverings are placed on top of sensor arrays, they generally desensitize the sensors and function as low-pass temporal and spatial filters with respect to incident stimuli, thereby attenuating dynamic information.

It is a general property of biological sensory receptors that they are highly evolved structures in which the receptors themselves and the tissues in which they are located may contain many features designed to enhance their sensitivity and the quantity of information that they can provide to the central nervous system. The skin contains multiple types of mechanoreceptors to transduce a variety of mechanical events that occur during contact with physical objects. These receptors are concentrated in sites such as the finger tips, where their sensitivity is enhanced by the mechanical properties of the skin, underlying pulp and bone, and adjacent fingernails.

The input-output properties of these biological transducers differ generally from engineered transducers. Engineered transducers are usually designed to produce a linear response to a single mechanical variable such as normal or tangential force at a single point. The signals from arrays of such transducers can be combined according to simple, analytical algorithms to extract orthogonal physical parameters of touch such as total force, center of force, directional force vector and two-point resolution. Biological touch receptors are highly nonlinear and non-orthogonal. Their signals are combined by adaptive neural networks to provide subconscious adjustment of motor output as well as high level conscious perception associated with haptic identification of objects. Neurophysiologists and psychologists often correlate the activity of somatosensory receptors and design measures of psychophysical percepts according to canonical physical parameters, but there is little evidence that the nervous system actually extracts direct representations of such parameters as an intermediate stage between sensation and performance. In fact, information theory suggests that such an intermediate representation would add noise and reduce information content, which would place such a strategy at an evolutionary disadvantage.

Engineered sensors and their signal processing systems use linear, orthogonal representations because the downstream control systems generally have been based on such inputs. This strategy may work well for engineered systems such as industrial robots that can perform accurately for highly constrained and predictable tasks. It is difficult to apply to anthropomorphic robots and prosthetic limbs that can perform a broad and unpredictable range of tasks associated with activities of daily living. The problem may further be complicated by environmental factors in such environments (e.g. temperature, moisture, sharp edges etc.), which tend to damage or bias sensitive and/or physically exposed transducers.

U.S. Pat. No. 4,980,646, to Zemel ("Zemel"), is incorporated in its entirety herein by reference and teaches a tactile sensor based on changes in the local electrical resistance presented by a layer of weakly conductive fluid whose shape is deformed by external forces applied to a deformable membrane. Zemel describes the application of a voltage gradient across the entire extent of the fluid by means of electrodes arranged on either side of the array of sensing strips, and the measurement of the local strength of that gradient by differential voltage measurements between adjacent pairs of electrode strips. U.S. Pat. No. 4,555,953 to Dario et al., which is incorporated herein by reference in its entirety, teaches different techniques and materials that have been utilized for the construction of artificial skin-like sensors.

The following articles are referred to throughout the disclosure and their contents are incorporated by reference herein in their entireties: Lee M. H., Nichols H. R., Tactile sensing for mechatronics—a state of the art survey, Mechatronics 9:1-31 1999. Beccai L., Design and fabrication of a hybrid silicon three-axial force sensor for biomechanical applications Sensors and Actuators, A. Physical. Vol. A120, no. 2: 370-382. 17 May 2005. Mei T., et al., An integrated MEMS three-dimensional tactile sensor with large force range, Sensor and Actuators 80:155-162, 2000. Beebe D., et al., A silicon force sensor for robotics and medicine, Sensors and Actuators A 50:55-65,1995. Bloor D., et al., A metal-polymer composite with unusual properties, Journal of Physics D: Applied Physics, 38: 2851-2860, 2005. Vasarhelyi G., et al. Effects of the elastic cover on tactile sensor arrays. Sensors and Actuators132:245-251, 2006. Helsel, M., et al., An impedance tomographic tactile sensor, Sensor and Actuators. Vol. 14, No. 1, pp. 93-98.1988. Russell, R. A., Parkinson, S., Sensing surface shape by touch, IEEE International Conference on Robotics and Automation, Vol. 1 423-428, 1993. Kenaly G., Cutkosky M., Electrorheological fluid-based robotic fingers with tactile sensing, Proceedings of IEEE International Conference on Robotics and Automation 1:132-136, 1989. Voyles R., et al., Design of a modular tactile sensor and actuator based on an electrorheological gel, Proceedings of IEEE International Conference on Robotics and Automation, 1:132-136, 1989. Lee Y. K., et al., Mechanical properties of calcium phosphate based dental filling and regeneration materials, Journal of Oral Rehabilitation 30; 418-425, 2003. D. Merrill, et al., Electrical stimulation of excitable tissue: design of efficacious and safe protocols, Journal of Neuroscience Methods, 141: 171-198, 2005. A. Dalmia, et al., Electrochemical behavior of gold electrodes modified with self-assembled monolayers with an acidic end group for selective detection of dopamine, Journal of Electrochemistry, 430: 205-214, 1997. B. Piela, P. Wrona, Capacitance of the gold electrode in 0.5 M sulfuric acid solution: AC impedance studies, Journal of Electrochemistry, 388: 69-79, 1994. Johansson R., et al., Somatosensory control of precision grip during unpredictable pulling loads, Changes in load force amplitude, Experimental Brain Research 89: 181-191, 1992. Birznieks I., et al, Encoding of direction of fingertip forces by human tactile afferents, Journal of Neuroscience. 21:8222-8237, 2001. Flanagan J. R., et al. Control of fingertip forces in multi-digit manipulation, Journal of Neurophysiology. 81:1706-1717, 1999. Johansson R. S., Westling G., Roles of glabrous skin receptors and sensorimotor memory in automatic control of precision grip when lifting rougher or more slippery objects, Experimental Brain Research. 56:550-564, 1984. Johansson R. S., Westling G., Signals in tactile afferents from the fingers eliciting adaptive motor responses during precision grip, Experimental Brain Research, 66:141-154, 1987. Westling G., Johansson R. S., Responses in glabrous skin mechanoreceptors during precision grip in humans, Experimental Brain Research. 66:128-140, 1987. K. Hornik, et al., Multilayer feed forward networks are universal approximators, Neural Networks, 2(5):359-366, 1989. Park, J. and I. Sandberg, Approximation and radial-basis-function networks, Neural Computation 5, 305-316, 1993. Caudill, M.; Butler, C., Understanding Neural Networks: Computer Explorations; Volume 1: Basic Networks; The MIT Press; Cambridge, Mass., 1992. D. Yamada, et al., Artificial Finger Skin having ridges and distributed tactile sensors used for grasp force control, Proc. IEEE/RSJ International Conference on Intelligent Robots and Systems, pp. 686-691, 2001. Y. Mukaibo, et al., Development of a texture sensor emulating the tissue structure and perceptual mechanism of human fingers, Proc. of the 2005 IEEE International Conference on Robotics and Automation, pp. 2576-2581, 2005. Johansson R. S. and Westling G., Role of glabrous skin receptors and sensorimotor memory in automatic control of precision grip when lifting rougher and more slippery objects, Experimental Brain Research 56: 550-564, 1984. Cole K. J., Johansson R., Friction at the digit-object interface scales the sensory-motor transformation for grip responses to pulling loads, Experimental Brain Research, 95: 523-532, 1993. Johansson R., et al., Somatosensory control of precision grip during unpredictable pulling loads, II Changes in load force rate, Experimental Brain Research 89: 192-203, 1992. Gordon A., et al., Memory representation underlying motor commands used during manipulation of common and novel objects, Journal of Neurophysiology 69: 1789-1796, 1993. Johansson R. S., Birznieks I., First spikes in ensembles of human tactile afferents code complex spatial fingertip events, Nature Neuroscience 7:170-177, 2004. Butterfass, J., DLR-Hand II: Next generation of a dexterous robot hand, Proc. of the 2001 IEEE, International Conference on Robotics & Automation, Seoul, Korea, May 21-26, 2001. Mountcastle V. B., The view from within: Pathways to the study of perception, The John Hopkins Medical Journal, 136:109-131, 1975. Wettels N., et al., Biomimetic Tactile Sensor for Control of Grip, IEEE Rehabilitation Robotics, 2007, Proceedings of the IEEE International Conference on Robotics and Automation, pp 109-114, 2001. N. Wettels, et al., "Biomimetic tactile sensor array" Advanced Robotics, vol. 22, no. 7, June 2008.

SUMMARY

Embodiments of the present disclosure are directed to biomimetic sensors, and related structures and processes. Exemplary embodiments of the present disclosure include sensory devices that have features comparable to features found in biological systems. In particular, they may use biomimetic mechanical structures similar to those found in the finger tip to endow a set of simple, robust electronic sensors with a wide range of modalities and sensitivities similar to those found in biological mechanoreceptors. Exemplary sensory devices include a sensor assembly whose basic form and function are similar to that of a human finger tip. The sensory device may have a biomimetic shape of a core with covering skin and pulp (fluid reservoir) that results in distinctive and readily detectable patterns of impedance changes across an array of electrodes disposed on the core, to take advantage of the various distortions of the pulp produced by the contact parameters to be detected and discriminated. High detection sensitivity and wide dynamic range can be achieved for monitoring and/controlling the forces between a manipulator and objects being manipulated. The biomimetic designs of such sensor assemblies can allow for detection of stimulus features, e.g., by feature extraction circuitry, including those features that may be most useful for automatic adjustment of contact force to achieve and maintain stable and efficient grasp of an object. An exemplary embodiment comprises a device through which a set of information is generated concerning tactile interaction between a manipulator and an object to be manipulated and recognized. Such a device can be incorporated into autonomous robots, telerobots or prosthetic limbs. The tactile information may be generated either by robot or prosthetic finger tips.

Biomimetic tactile sensors taught herein may possess softness, elasticity, and some mechanical resistance that mimics natural human skin. Such sensors can detect and discriminate various aspects of contact with external objects, including the direction and magnitude of force, the location, extent and shape of the contacting object, and small movements associated with impending slip. Furthermore, such sensors may discriminate thermal properties of contacted objects through heat-flow sensing.

Exemplary embodiments may employ a number of small, local electrodes, e.g., deployed in a curved array, as part of a sensing modality having a shape and mechanical properties to mimic those of a biological finger tip. Such electrodes can be used to detect changes in impedance of a fluid within the sensor. Each sensing electrode may be energized to provide an independent measure of the local mechanical deformations of the overlying membrane based on its impedance with respect to a remote common electrode. Further improvements are described to enhance the sensitivity and dynamic range of each sensing electrode by contouring the inner surface of the overlying membrane. In further embodiments, neural networks may compute directly the actuator adjustments required to maintain stable grip of objects with a variety of shapes and force vectors in a manner similar to that employed by neural control of the human hand.

Exemplary embodiments can include one or more temperature sensors, e.g., thermocouple or thermistor, mounted to the surface of the core. The surrounding core is heated by the supporting electronics above ambient; when objects are contacted, they will cause temperature changes in the temperature sensor (e.g., thermistor) consummate with their thermal properties. These detected voltage changes can be exported to logic for analysis.

Exemplary embodiments of biomimetic sensors and related techniques may employ a fluid pressure sensor either stand-alone or in addition to other types of sensor modalities, e.g., a number of small, local electrodes deployed in a curved array to detect fluid impedance changes. Utilizing a fluid pressure sensor to detect the static and dynamic pressure of a fluid trapped between an elastomeric skin and a rigid core allows for the detection of dynamic vibrations that arise as a device of this design is slid across a textured surface mimicking the function of known biological transducers. Furthermore the sensing of static pressure levels of the fluid can be used to enhance the ability to extract the normal forces as detected by impedance electrodes. Such fluid pressure sensing can confer a very high sensitivity to vibrations associated with dynamic friction-induced vibrations at the contact surface in a uniquely robust package.

To increase the robustness of the design the pressure sensor may be located inside a rigid core where it is displaced from the contact region of the finger. From this location it can be coupled with the fluid via a small pathway. A fluid with low compressibility and low viscosity can be used to reduce the attenuation as the pressure waves travel to the transducer in this remote location.

Embodiments can include a biomimetic tactile sensor that is sensitive to the wide range of normal and shear forces encountered in robotic and prosthetic applications. Spatially resolved force distributions can be detected through electrode impedance fluctuations as the conductive fluid profile deforms. A useful force range for biomimetic impedance sensors can be extended by internally texturing their elastomeric skin. One or more temperature sensors (e.g., a thermistor) can be placed on the surface of a biomimetic to enable gross temperature sensing and thermal compensation of fluid conductivity for force sensing. The temperature sensors (thermistor) or the core material around it can be heated above ambient to detect heat flow to extract thermal features of contacted objects. Heat produced of dissipated by a microprocessor within control electronics can, for exemplary embodiments, be controlled (e.g., by appropriate software/firmware instructions), which is used to affect thermal characterization of contacted objects.

One embodiment of the present device may consist of a set of sensors that work by measuring static and dynamic pressure in a fluid or gel that is trapped by the elastomeric skin. The pressure transducer may be deployed inside a substantially rigid core that is protected from direct contact with external objects. A feature of this design may be the location of mechanically vulnerable pressure transducer and signal processing circuitry, which can be wholly contained within the substantially rigid core. A related feature may be that this design enables methods of manufacture and repair that are simple and efficient.

The plurality of sensors and their associated mechanical structures have similarities to the biological relationships among the cutaneous neural receptors, the distal phalanx, overlying finger pulp and covering skin and nail. Information may be extracted from such a plurality of sensors whereby such information can be related to canonical physical representations used to describe stimuli to be sensed, and/or used to control automatic adjustments of grip forces similar to the neural reflexes whereby humans maintain stable grip on complex objects.

One embodiment of present device may consist of a biomimetic tactile sensor that includes a dynamic pressure sensor to measure fluid pressure changes due to sliding motion of the device skin over a surface encountered in robotic and prosthetic applications. In a preferred embodiment the fluid can have a low viscosity and low compressibility such that these dynamic pressures are transmitted with little attenuation through the fluid allowing for the pressure detection circuitry to be housed far away from the contact surface where it can be protected from damage while still maintaining sensitivity to dynamic tactile events. Another embodiment of the present device may consist of a biomimetic tactile sensor capable of detecting vibrations relating to the onset of slip. Another embodiment may consist of a biomimetic tactile sensor with signal processing electronics for rapid extraction of spectral information of these vibrations for real-time slip detection and automated grip control.

Another embodiment may consist of a biomimetic tactile sensor with signal processing electronics which also adds normal and tangential force sensing to determine the true coefficient of friction between the interface between the finger and the object. Another embodiment may consist of a method of controlling grip force based on the accurate measure of grip force as detected by the biomimetic tactile sensor and signal processing electronics. Another embodiment may consist of a method of controlling grip force that reduces power by relaxing grip force until slip is detected and then increasing grip force to maintain grasp. Another embodiment of the present device may consist of a biomimetic tactile sensor capable of detecting vibrations characteristic of surface texture. Another embodiment may consist of a biomimetic tactile sensor with signal processing electronics for extraction of spectral information related to texture for texture identification. Another preferred embodiment may consist of a biomimetic tactile sensor capable of sensing normal and shear forces that are used in conjunction with an actuator to control the exploration of a surface in an optimal pattern to identify texture. Another embodiment may consist of a biomimetic tactile sensor capable of sensing friction-induced vibrations in conjunction with a haptic display to replay this information on human skin to take advantage of biological mechanisms of slip detection and texture identification. Another embodiment may consist of a biomimetic tactile sensor with external texturing similar to fingerprints or bumps which further enhances the response of the sensor to friction induced vibrations.

It should be understood that other embodiments of biomimetic tactile sensor systems and methods according to the present disclosure will become readily apparent to those skilled in the art from the following detailed description, wherein exemplary embodiments are shown and described by way of illustration. The biomimetic tactile sensor systems and methods are capable of other and different embodiments, and details of such are capable of modification in various other respects. Accordingly, the drawings and detailed description are to be regarded as illustrative in nature and not as restrictive.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 4 depicts forces diagrams of a tactile sensor, showing measurement of both normal and shear forces, at a cross section of the tactile sensor subjected to low shear force (A), and a cross section of the tactile sensor subjected to high shear force (B), in accordance with exemplary embodiments of the present disclosure;

FIG. 5 depicts an internally textured skin with asperities; a perspective view is shown (A), a side view depicts an uncompressed state, (B) and a side view is shown depicting an applied force that compresses the textured rubber and narrows the flow path of the fluid to the electrode surface (C), in accordance with exemplary embodiments of the present disclosure;

FIG. 9 illustrates a cross section of synthetic skin with ridges performing the function of fingerprints to enhance vibrations, in accordance with exemplary embodiments of the present disclosure;

Figure 1:
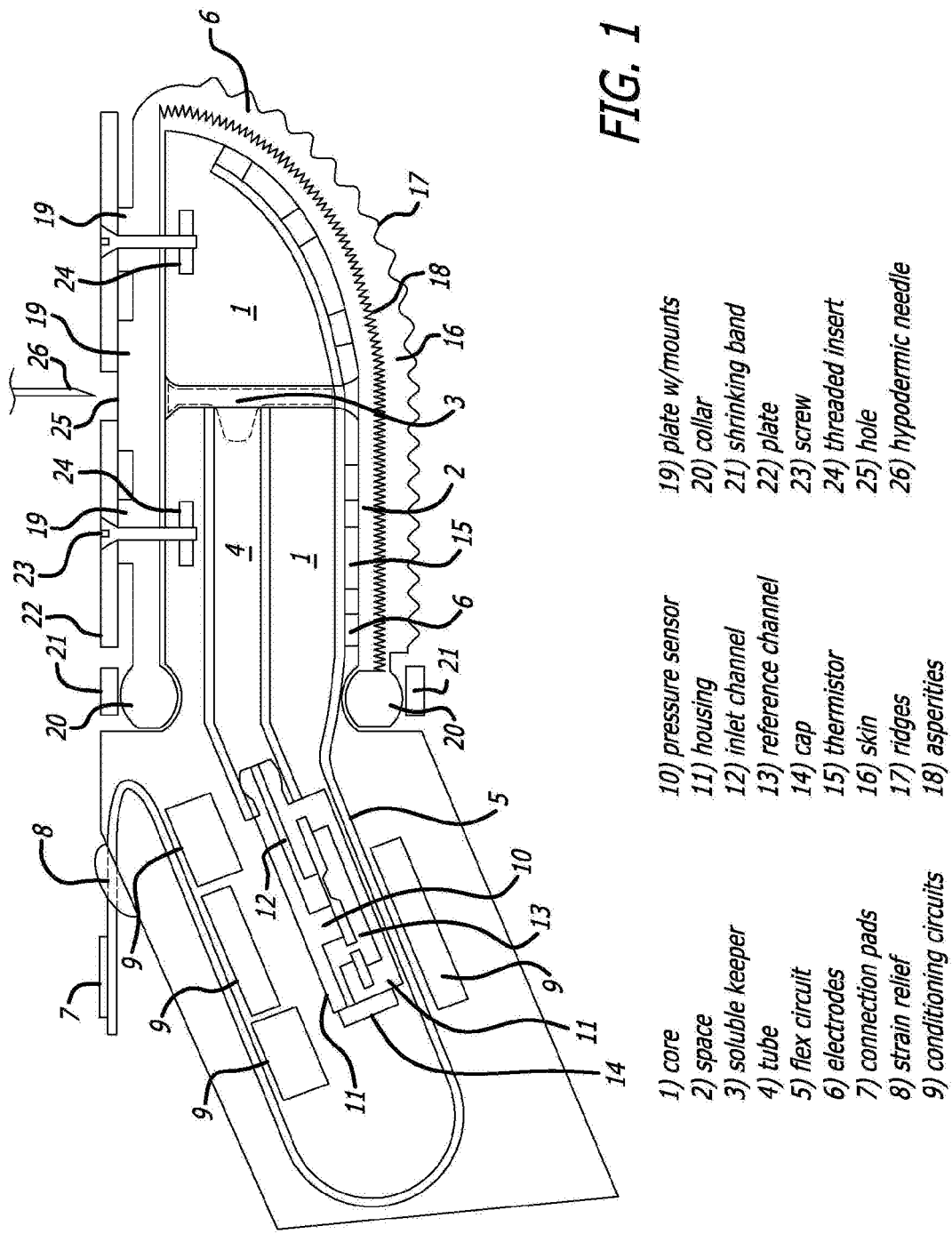
FIG. 1 depicts a longitudinal cross-section of a tactile sensor in the form of a finger pad, in accordance with exemplary embodiments of the present disclosure.

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The detailed description set forth below is intended as a description of exemplary embodiments of the tactile sensory system and method and is not intended to represent the only embodiments in which the biomimetic tactile sensor systems and methods can be practiced. The term "exemplary" used throughout this description means "serving as an example, instance, or illustration," and should not necessarily be construed as preferred or advantageous over other embodiments. The detailed description includes specific details for the purpose of providing a thorough understanding of the tactile sensory systems and methods. It will be apparent, however, to those skilled in the art that the tactile sensory systems and methods may be practiced without these specific details. In some instances, well-known structures and devices are shown in block diagram form in order to avoid obscuring the concepts of the tactile sensory systems and methods.

A prosthetic hand or anthropomorphic robotic manipulator in accordance with the present disclosure can combine several sensor assemblies at the ends of appendages controlled by actuators, similar to the individual finger tips of a biological hand or foot. Pad-like structures with sensors can be deployed on grip contact surfaces akin to the palmar eminences over the heads of the metacarpal bones etc. One or more such sensor assemblies could be built with various sizes and shapes and mounted in varying numbers and positions on a variety of hand-like or foot-like locomotor supports to interact with external objects while utilizing information derived from a plurality of contact sensors having one or more types of sensing modalities.

The plurality of sensors and their associated mechanical structures can have similarities to the biological relationships among the cutaneous neural receptors, the distal phalanx, overlying finger pulp and covering skin and nail. Information may be extracted from such a plurality of sensors whereby such information can be related to canonical physical representations used to describe stimuli to be sensed, and/or used to control automatic adjustments of grip forces similar to the neural reflexes whereby humans maintain stable grip on complex objects.

General Scheme

As described in detail below and in FIGS. 1-9, a sensor assembly 100 can consist of mechanical elements corresponding to a biological fingertip, namely a molded, rigid core 1 corresponding to the bone, a molded, elastomeric skin 16 corresponding to the biological skin, a fluid-filled space 2 corresponding to the deformable pulp of a biological finger, and a plate 22 affixing the skin 16 to the top surface of the fingertip corresponding to a fingernail.

One embodiment of the present device may consist of a set of sensors that work by measuring electrical impedances through a weakly conductive fluid in contact with a plurality of electrodes. The electrodes may be deployed on a substantially rigid core that is protected from direct contact with external objects by overlying deformable structures. A feature of this design may be the location of mechanically vulnerable connections between the electrodes and the signal processing circuitry, which are wholly contained within the substantially rigid core. A related feature may be that this design enables methods of manufacture and repair that are simple and efficient.

In exemplary embodiments of the present disclosure, three types of sensors and their related signal processing circuitry may be utilized; such sensors may be incorporated alone or in various combinations:

i) Impedance Sensing—electrodes 6 on the surface of the core 1 that are used to detect changes in the impedance through the weakly conductive fluid that arise as a result of deformation of the overlying skin 16;

ii) Pressure Sensing—one or more pressure sensors 10 that detect pressure changes and vibrations conveyed through a fluidic path 4 from the skin 16 to the pressure sensors 10; and iii) Temperature Sensing—a temperature sensor (e.g., thermistor 15) capable of detecting temperature and temperature fluctuations.

As described in FIGS. 10-15, one or more sensor assemblies 100 and their associated signal conditioning circuitry 9 can be incorporated into actuated manipulators 500 that perform exploratory movements that both rely on the signals from the sensors 100 to control their movements and interactions with external objects and surfaces and utilize signals from the sensors 100 to identify various properties of external objects and surfaces.

Mechanical and Fluidic Platform

Referring again to FIG. 1, a sensor assembly 100 consists of a substantially rigid central core 1 covered by an elastomeric skin 16. The surface of core 1 contains a multiplicity of electrodes 6. A weakly conductive fluid is introduced into space 2 thereby separating skin 16 from that region of the core 1 where electrodes 6 are located. The edge of skin 16 is shaped and dimensioned into collar 20 which provides a seal to core 1 to prevent leakage of the fluid; the force affecting this seal may be augmented by shrinking band 21. The portion of skin 16 that lies on the top portion of sensor assembly 100 is compressed against core 1 by plate 22, which is held in place by screws 23 tightened into threaded inserts 24 in core 1. Thus the overall structure is similar to a human fingertip with a fingernail.

The weakly conductive fluid can be introduced into space 2 via hypodermic needle 26 during manufacture or servicing. Plates 19 molded into skin 16 create pressure seals around screws 23 and hole 25 where the pressurized region of skin 16 forms a resealable injection port when punctured by hypodermic needle 26. This process can be aided by monitoring the fluidic pressure as sensed by a pressure sensor 10 to inflate to a prescribed hydraulic pressure level.

It is important for the reliable function of the sensors described below that there be no air bubbles in the weakly conductive fluid and that it be contiguous with an inert, immiscible fluid contained within tube 4 and inlet channel 12 of pressure sensor 10 contained within housing 11. One way to avoid air bubbles is to prevent their introduction in the first place. In an exemplary embodiment, this can be accomplished through the following design features illustrated in FIG. 1 and fabrication steps:

1. Core 1 is designed to be injection molded around all of the internal components illustrated in FIG. 1.
2. At the time of molding, tube 4 and inlet channel 12 will have already been filled with inert fluid and plugged with soluble keeper 3 made from a material that dissolved readily upon contact with the weakly conductive fluid but not the inert fluid. Soluble keeper 3 contacts the walls of the mold so that it forms a continuous path from the location of the resealable injection port to the space 2 to be inflated with weakly conductive fluid.
3. Core 1 can be inserted into skin 16 without introducing air pockets by performing this step while submerged in a fluid.
4. Soluble keeper 3 can be made from a material such as polyvinyl alcohol that can be softened by heating and then displaced and dissolved by the weakly conductive fluid when it is introduced via hypodermic needle 26.

In one exemplary embodiment, the choice of the weakly conductive fluid is a solution of 0.4M NaI in propylene glycol. One choice of the inert fluid in contact with the pressure sensor is mineral oil. It is desirable to protect the transductive electronic elements of pressure sensor 10 from contact with the salt ions that provide the electrical conductivity of the weakly conductive fluid, hence the requirement that these two fluids be immiscible in each other. It is also desirable the weakly conductive fluid not lose substantial volume by outward diffusion through skin 16 or gain substantial volume by inward diffusion of water if the sensor is used in a humid or wet environment. This can be achieved by the selection of propylene glycol as the solvent base of the weakly conductive fluid and silicone elastomer for the skin 16. These examples are illustrative only; other combinations of fluids and elastomers meeting these general requirements can be practiced within the scope of the present disclosure.

The components that are contained within core 1 can be preassembled mechanically and electrically via flex circuit 5 and loaded into the injection mold used to form core 1. These mechanical and electrical connections can be made by conventional techniques well-known to practitioners of the art, including soldering and conductive epoxy. These components include electrodes 6, which can be made from disks of conductive, inert metals such as gold or platinum, thermistor 15, pressure sensor 10 in housing 11, and electronic components 9 as required for signal conditioning and processing as described later.

The sensor assembly 100 has been designed with many features such that the sensing mechanisms are robust and protected by the rigid core 1. This permits for the sensor assembly 100 to have a prolonged useful life before needing replacement. The elastic skin 16 however through normal operation will wear down at a much faster rate and will need to be replaced in more frequent service intervals. The design of this tactile sensor consisting of a homogeneous elastic skin which contains no electronics provides a unique advantage of low repair costs as the materials for casting skins are comparatively cheap than skins used in competing technologies.

In order to keep the costs of repairs low and maintain this competitive advantage a method to permit the end-user to replace skins as necessary was implemented into the skin design. This was achieved with the addition of a self-sealing skin 16 that once inserted onto the core 1 produced compression forces into a groove in which it rests. By intentionally creating an insertion hole of the skin that is smaller than the groove in the core 1 it will rest in it is possible to produce the sealing properties needed to maintain the internal fluid pressure inside the tactile sensor. Care can also be taken such that the hole is large enough that it will not tear as it passes over the tactile sensor before resting in the groove.

Figure 2:
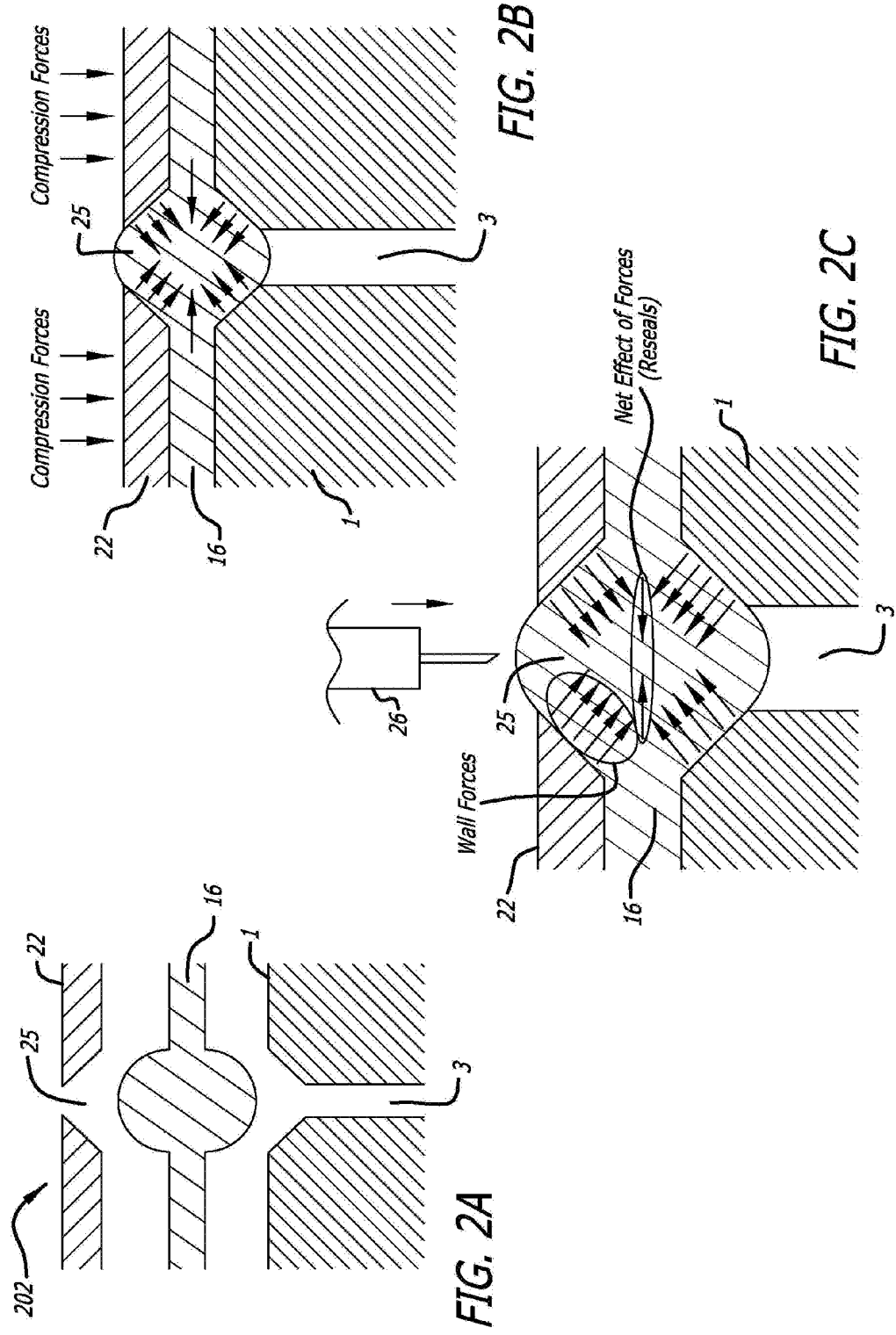
FIG. 2 depicts several views including a detail of a fill-port disassembled (A) and assembled (B), and detail of resealing forces present on the fill-port (C), in accordance with exemplary embodiments of the present disclosure.

Referring to the detailed drawing in FIG. 2, injecting fluid into the device may be made possible by inserting a hypodermic needle 26 through hole 25 in plate 22 which was designed to reseal after the hypodermic needle 26 is removed. Novel aspects of this design include forming the elastic skin 16, rigid plate 22 and rigid core in such a way that once compressed and held together with screws 23 the resulting pressure produces adequate sealing properties, this is illustrated in FIGS. 2 (A) and (B). At the location of the inflation hole 25 the skin 16 is thickened to permit for the development of compression forces from the rigid surfaces it contacts once assembled. The core 1 and plate 22 are made of a material of higher stiffness than the skin to ensure that the skin absorbs the deformation. As shown in FIG. 2 (C), the rigid surfaces on the core 1 and the place 22 that come into contact with the deformable skin 16 are angled such that the resultant forces produce compression perpendicular to the axis in which the hypodermic needle 26 will be inserted. Once the syringe is removed these forces act to reseal the tiny hole that was created when the hypodermic needle 26 was inserted. This allows for the skin 16 to have a longer lifetime over more inflation cycles before needing to be replaced.

The following references, which are incorporated by reference in their entireties, teach various features that may be utilized in the present tactile sensor devices and methods: U.S. Pat. No. 6,871,395 to Scher et al. teaches connecting electrically conductive elastomer to electronics and U.S. Pat. No. 6,529,122 to Magnussen et al. teaches measuring contact resistance between work pieces, U.S. Pat. No. 5,905,430 to Yoshino et al. for detecting state of contact between a contact member and a work piece, U.S. Pat. No. 5,033,291 to Podoloff et al. for flexible tactile sensor for measuring foot pressure distributions; U.S. Pat. No. 5,014,224 to Hans for determining location and amount of exerted pressure; U.S. Pat. No. 4,817,440 to Curtin for identifying contact force and the contact pattern; U.S. Pat. No. 4,526,043 to Boie et al. for conformable tactile sensor; and U.S. Pat. No. 4,481,815 to Overton for determining a parameter of an object being contacted by the tactile sensor.

Sensing Elements and Signal Conditioning

Impedance Sensing may be accomplished by measuring changes in the electrical impedance among electrodes 6 whose distribution and location on the contoured surface of the core 1 may be a key factor in the sensing properties of the sensor assembly 100. One embodiment of detection circuitry 9 is illustrated schematically in FIG. 3 and described in more detail below. The electrical impedances $Z_{0-15}$ so measured can be dominated by the dimensions and electrical properties of the weakly conductive fluid in space 2. These dimensions are changed by forces applied to skin 16, which result in deformation of the skin 16 and displacement of the weakly conductive fluid. Multiplexer 215 selects each electrode in turn for connection to the measurement circuitry under the control of microcontroller 230. The impedance Z of a selected electrode 6 can be measured by applying a voltage to a circuit consisting of one or more excitation electrodes 6 located elsewhere on the surface of core 1 in series with selected electrode 6 and the intervening weakly conductive fluid path between them plus a fixed reference resistor 220 labeled $R_{load}$. Advantageously, the applied voltage is an alternating or pulsatile voltage that does not result in net direct current flow through the electrodes 6 which would tend to damage them by inducing electrolysis and corrosion. In the preferred embodiment in FIG. 3, this is achieved by using a clock signal CLK in series with a DC blocking capacitor, but other configurations would be obvious to someone normally skilled in the art. At the peak of each pulse in clock signal CLK, the voltage across $R_{load}$ is measured by analog-to-digital convertor contained within microcontroller 230. $R_{load}$ plus the selected one of $Z_{0-15}$ constitute a voltage divider such that the voltage measured across $R_{load}$ varies inversely with the selected impedance from $Z_{0-15}$.

Pressure Sensing may be accomplished by one or more pressure sensors 10, whose transductive elements are represented by the variable resistors in the bridge circuits $P_{AC}$ and $P_{DC}$ in FIG. 2. Pressure Sensing can be usefully divided into the relatively large, quasistatic pressures $P_{DC}$ in the fluids, which are measured by pressure sensing subsystem 205, and the much smaller, audio frequency vibrations $P_{AC}$ arising as the skin 16 slides over objects in contact with sensor assembly 100, which are measured by vibration sensing subsystem 205. The sensitivity and dynamic range of a pressure sensor 10 depends on the nature of the material contained within its associated reference channel 13 within its housing 11. In the preferred embodiment, pressure sensing subsystem 205 includes a wide dynamic range pressure sensor 10 and its reference channel 13 is filled with an air pocket that is trapped there by cap 14. The vibration sensing subsystem 205 includes a narrow dynamic range pressure sensor 10 that needs only to be sensitive to alternating fluctuations in pressure. This is achieved by trapping an air pocket in its reference channel 13 but connecting the other side of the reference channel via a small gage tube (not illustrated) back to its inlet channel 12.

The combination of an incompressible fluid path in the inlet channel 12 and a compressible air bubble in series with the high fluidic resistance of the small gage tube constitutes a mechanical high pass filter, protecting pressure sensor 10 from large hydrostatic pressures that may arise in the fluid during the initial inflation of space 2 or firm contact with external objects. This allows for use of a more sensitive transducer with smaller dynamic range but larger signal-to-noise ratio. Alternatively, if a single pressure sensor 10 is available with sufficient dynamic range and signal-to-noise values, both pressure and vibration information may be extracted from it using analog or digital signal conditioning means as would be obvious to one normally skilled in the art. The signals from the one or more pressure sensors 10 are suitably amplified by X100 and digitized by ADC channels in microcontroller 230.

Figure 3:
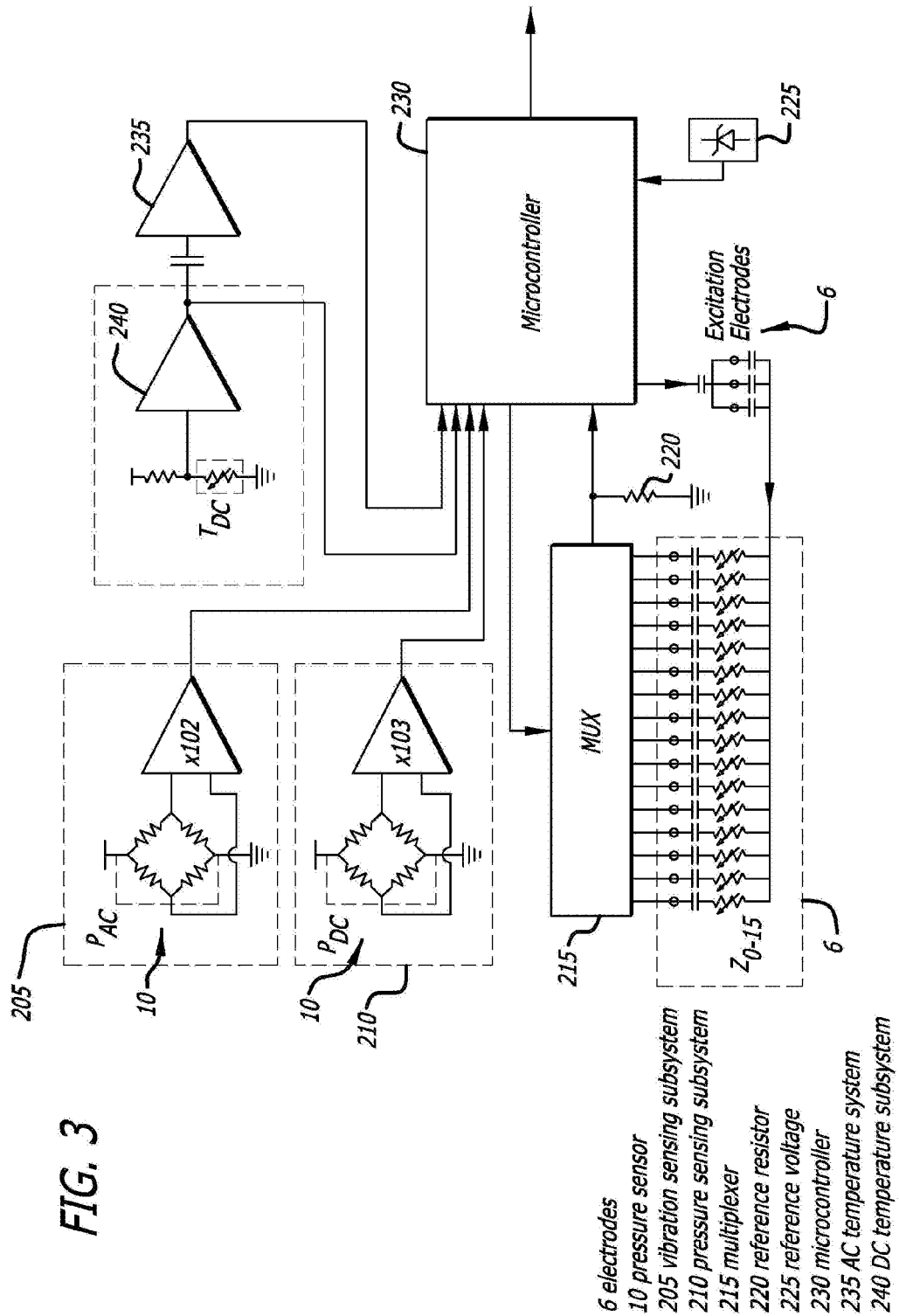
FIG. 3 depicts a schematic of the electronic system for signal detection and processing, in accordance with exemplary embodiments of the present disclosure.

Temperature Sensing may be accomplished via thermistor 15 and associated circuitry described in FIG. 3. Temperature Sensing may be usefully divided into i) quasistatic sensing of ambient temperature $T_{DC}$ by thermistor 15 in DC temperature subsystem 240; and ii) dynamic sensing of local fluctuations in temperature $T_{AC}$ by AC temperature subsystem 235. Such fluctuations in temperature that may be induced by contact between the region of the skin 16 overlying thermistor 15 (as illustrated mechanically in FIG. 1) and an external object at a temperature different from the ambient temperature. The ambient temperature in sensor assembly 100 depends on the equilibrium between heat energy generated through the operation of all of its electronic components 9 and the heat energy conducted away by various conductive, convective, and radiative losses. The heat energy generated will tend to be dominated by the contribution from microcontroller 230, whose power dissipation can be controlled dynamically by its software, for example by changing its clock rate or sleep intervals. The ambient temperature in the environment around sensor assembly 100 can thus be inferred by the amount of heat energy that can be generated to keep thermistor 15 at a desired temperature, such as the 37 C core temperature of the human body. In a preferred embodiment, $T_{DC}$ is sensed by a voltage divider and amplifier, one of many measurement circuits that would be well-known to practitioners of the art. The fluctuations $T_{AC}$ will depend on the difference between the temperature of the core 1 and the temperature of a contacting object, the thermal conductivity of that contacting object, and the location, extent and force of contact between sensor assembly 100 and the contacting object. These fluctuations can be high-pass filtered and amplified to generate $T_{AC}$. The signals from DC temperature subsystem 240 and AC temperature subsystem 235 are digitized by ADC channels in microcontroller 230.

Signal Processing and Transmission

It is useful to minimize the number of electrical connections that can be made from the control system for a manipulator 500 (described in more detail below in FIG. 10) to the one or more sensor assemblies 100 incorporated into a manipulator 500. This can be done by multiplexing the data derived from all of the sensing functions in each sensor assembly 100 into a serial stream of digital bits. The circuitry required for energizing the sensors, analog signal conditioning, digitization and serialization into a standard protocol (e.g., SPI or I2C) may be located physically in the fingertip, along with the various electrodes 6, other transducers and their electrical connections. In an exemplary embodiment a simple circuit can be built from off-the-shelf components, including integrated circuits that could be procured as surface-mount packages or bare dies and incorporated onto flex circuit 5.

Representation of Features of Contact by Impedance Sensors

FIG. 4 illustrates a cross-sectional view of sensor assembly 100 that is orthogonal to the view in FIG. 1. The positioning of the electrodes 6 with respect to the contours of the core 1 and overlying fluid-filled space 2 and skin 16 may cause distinct patterns of change in the various impedances $Z_{0-15}$ measured by electronic components 9 as the sensor assembly 100 contacts various objects and surfaces with various force vectors. It may be useful to identify how different aspects of any particular stimulus parameter to be sensed will influence the array of electrodes comprising the sensor assembly 100.

In the example illustrated in FIG. 4, a single point of contact may experience various combinations of normal and tangential force components (labeled Fnorm and Ftang, respectively), which result in distributed changes in the impedances measured at each of the electrodes 6 as a result of sliding and deformation of skin 16 with respect to core 1 and plate 22. In this example, it is advantageous for the fluid in space 2 to lubricate the interface between the inner surface of skin 16 and the surface of core 1 and electrodes 6 in order to facilitate sliding between them. One choice for such a fluid that is compatible with the other requirements upon this fluid is propylene glycol. Pending related U.S. patent application Ser. No. 11/692,718, incorporated herein by reference in its entirety, describes in detail various mechanisms whereby various features of contact can be discriminated, including contact force, centroid and area of force, eccentricity of force, shape of the external object, vector of force, and object hardness and softness.

If different features of contact between sensor assembly 100 and external objects result in sufficiently distinct output patterns across all of the elements of the sensor, then some information (particularly about position such as force centroids and areas) could be extracted analytically, based on a reasonable mathematical model. Sensor assembly 100 can have properties similar to the biological fingertip, however, so it may likely require non-analytical signal processing methods similar to those employed by the biological nervous system.

The temporospatial distribution of activity in the biological touch sensors depends complexly on the inherent sensitivity of the sensors, their distributions throughout the tissues of the fingertip and the forces that the fingers apply to external object, as well as on the nature of the external object itself. Similarly, in electrode array 6 of tactile sensors, force magnitude and location interact with each other. For example, the same force vector applied close to the nail bed may create a different amount of net impedance change than if applied to the fingertip; the total change in impedance may not be used as a measure of the applied force unless corrected for the position. At higher force levels the information about position may be blurred because of nonlinear changes in electrode impedance as the inside surface of the skin makes contact with the electrodes. This is similar to the saturation of light touch receptors and the need to incorporate information from deep touch and nociceptors in biological skin.

The characterization experiments described above may produce a rich data set consisting of pairs of input vectors (describing location and components of applied force) and output vectors (voltages related to impedances of the electrode array). These may be used to train neural networks for various tasks. This approach can be used to determine the discriminability of various input conditions or, conversely, to determine the ability to generalize a single parameter such as magnitude of forces applied to different portions of the finger tip. For the force intensity extraction, a multi-layer perceptron (MLP) and radial-basis neural network may be used initially because both have proven to be able to approximate any given non-linear relation when a sufficient number of neurons are provided in the hidden layer. Two-point discrimination may likely be possible but may depend critically on the thickness and viscoelastic properties of the skin. It may be feasible to employ algorithms known as neural networks that may function similar to those embodied in the nervous system in order to identify the nature of the contact state in terms of feature of contacted objects and spatiotemporal distribution of contact forces. That is, neural networks can be trained by learning to respond in a useful manner to those features of any stimulus that can be discriminated, as would be obvious to one normally skilled in the art. Active feature extraction is described in more detail in FIGS. 10-15 and related text.

Enhancement of Dynamic Range of Force Sensing

The dynamic range of forces that can be measured usefully by Impedance Sensing depends on the rate at which space 2 over a given electrode 6 tends to be occluded by increasing force applied to the overlying skin 16. The impedance of a fluid channel depends upon the resistivity of the fluid, the length of the channel and its cross-sectional area: $R=(\rho L)/A$. All else being equal, a channel with a larger average cross-sectional area will have lower impedance.

If both the core and the skin are smooth, there may be a tendency for the measured electrical impedance of the sensing electrode to rise abruptly and to saturate when the skin is pressed against it, forming a tight seal. By controlling the size, distribution and mechanical stiffness of surface textural features, the useful dynamic range of sensing can be greatly extended.

As illustrated in FIG. 5, the inner surface of skin 16 can include asperities 18 molded into the contour of the skin, for example, by forming skin 16 in an injection mold whose corresponding surface is a negative of the desired pattern of asperities 18. Other methods of fabrication of textures would be obvious to one normally skilled in the art, including photolithography, incorporation of soluble particles, plasma etching, etc. Related U.S. patent application Ser. No. 11/692,718 teaches that it may be desirable to have the inside surface of the skin patterned with "bumps and/or ridges".

Figure 6:
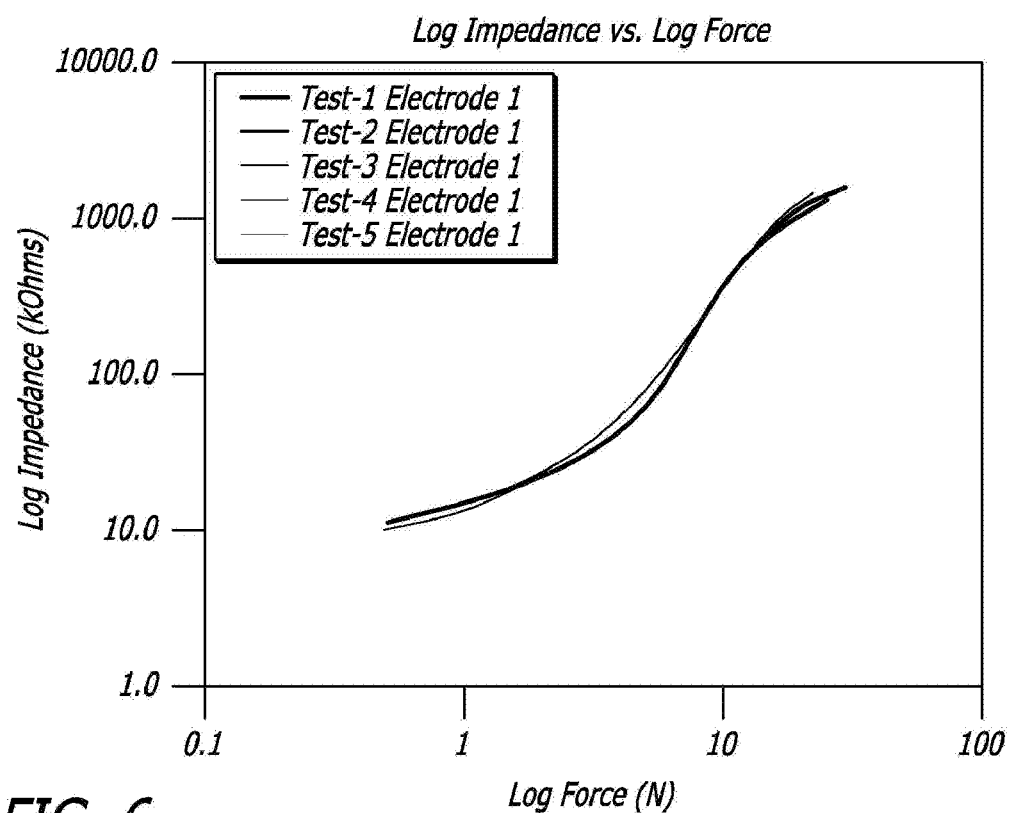
FIG. 6 illustrates a five-times-repeatability log-log plot of force versus impedance for a skin incorporating inner-surface asperities with dimensions 0.25 tall×0.25 mm diameter, in accordance with exemplary embodiments of the present disclosure.

FIG. 5A illustrates one advantageous embodiment of a useful surface textural feature consisting of a repeated pattern of closely spaced asperities 18, each of which is a pyramidal or columnar protrusions from the inner surface of skin 16. Such a pattern tends to leave channels of conductive fluid on the surface of core 1 and electrodes 6, which channels may be gradually compressed and narrowed with increasing compressive force applied to the skin, as illustrated in cross-sectional views in FIGS. 5B and 5C. FIG. 6 illustrates a wide dynamic range of input normal forces (log scale on abscissa) that result in a wide dynamic range of output electrode impedance (log scale on ordinate) for a pattern of cylindrical asperities 0.25 mm tall, 0.25 mm in diameter and 0.5 mm apart in a regular, square grid. The dynamic range can be extended by texturing the inner surface of the elastomeric skin.

When the skin contacts the core and occludes a given electrode, a seal is formed, isolating it from the fluid while impedance increases to infinity. This happens at low force levels, causing the device to function as a switch rather than a usable transducer. Texturing the internal surface of the skin allows for fluid pathways to exist even after the internal surface of the skin has been compressed against the electrode.

Other Aspects of Manufacture

A suitable sensor core can be fabricated by creating a negative mold of the desired core shape, advantageously using a relatively soft material such as machinist's wax. Components that need to be present on the surface of the mold (such as the electrode contacts and the capillary fill tube opening) can be affixed in the desired locations by pressing them onto the surface of the mold. Any desired mechanical or electrical connections from those components can be made to electronic circuits or connector pins in the open mold. All of the components and their interconnections are then embedded in the core material that is poured into the mold around the components and cured in place. High density polyurethane can be used to form the core. This method lends itself well to resealing the tactile array for different applications, changing the curvature of its surface, and/or changing the number and distribution of electrode contacts.

As described above, it may be advantageous and feasible to incorporate most or the entire signal conditioning circuitry and connections to the electrodes within the fingertip itself. This may greatly reduce the number of electrical connections that may be made to transmit the data from the tactile sensor array to whatever controller requires those data. The above-described method of forming the core by pouring and polymerizing the core material may be particularly well-suited for creating a rugged protective enclosure around such signal conditioning circuitry, which may obviate the need for bulky and expensive hermetic packaging and feedthroughs for the electronic circuitry. The material chosen for the core should be relatively impermeable to the fluid chosen to inflate the fingertip.

Dynamic Sensing of Fluid Pressure

Figure 7E:
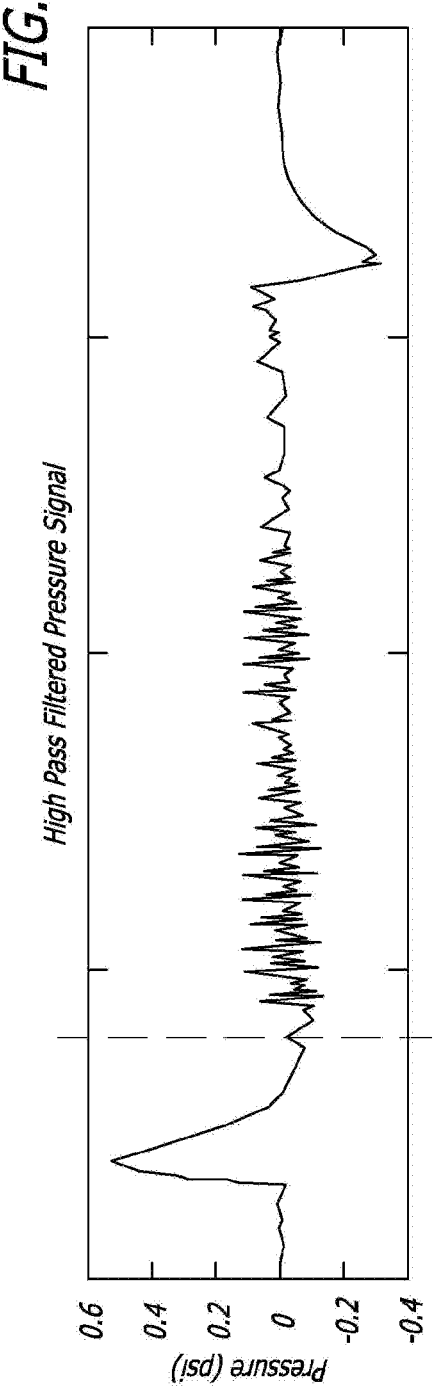
FIG. 7 demonstrates pressure signals associated with contact and sliding for a variety of contact events: tapping (A), pushing (B), sliding (C), and poking (D), along with an AC pressure signal (E) on the same time scale as normal and tangential forces as recorded by a force plate (F), in accordance with exemplary embodiments of the present disclosure.
Figure 7F:
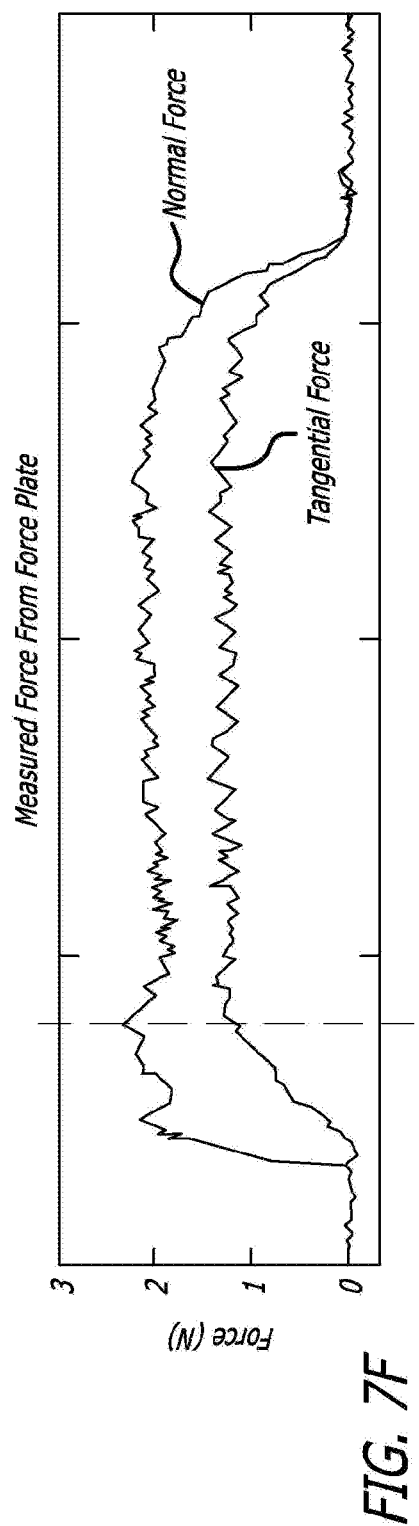

FIG. 7 illustrates the signals produced by a pressure sensor 10 connected to the incompressible fluid occupying space 2 of a sensor assembly 31 as it contacts a flat, hard surface with different patterns of force and motion. In FIG. 7A-D, the output of pressure sensing subsystem 210 reflecting $P_{DC}$ is provided as a function of time during various contact events. In FIG. 7E, the output of vibration sensing subsystem 205 reflecting $P_{AC}$ is provided as a function of time, along with the normal and tangential reaction forces (FIG. 7F) recorded by a commercial force-plate under the surface being contacted. Friction-induced vibrations in skin 16 are sensed as fluctuations in fluid-pressure by pressure sensor 10 having a bandwidth of approximately 0-1000 Hz. An exemplary embodiment included a commercially available pressure transducer (Honeywell Model #40PC015G1A) and based on the vibration sensitivity of the human finger an analog first-order low-pass filter with center frequency at 1000 Hz and a digital sampling rate of 2500 samples/sec were used.

Fidelity of transmission of acoustic signals is a concern when measuring dynamic fluctuations in pressure from a signal source at a remote location. Important parameters to consider are the geometries of pathways involved between the signal source and recording site as well as the wavelengths of signals being recorded. The wavelength of a signal ($\lambda$) can be calculated from the speed of sound in a media (c) and the frequency of the signal (f) from the following formula:

$$\lambda = \frac{c}{f}.$$

Given the inherently long wavelengths of these frequencies in candidate fluids, even the shortest wavelength of interest is on the order of 1 meter. This makes it possible to displace the pressure sensor 10 short distances in with respect to this wavelength without having to worry about acoustic interference due to the geometry of fluidic pathways. This is desirable because it removes the pressure sensor 10 from the contact surfaces of the skin 16 where it may be damaged from impact. Additionally, moving the pressure sensor 10 only a few centimeters from the contact surface and connecting it to the fluid through a tube 4 enables pressure sensor 10 to be housed safely within the core 1 with negligible losses from acoustic interference. Selection of an incompressible fluid with a low viscosity such a propylene glycol further enhances sensitivity.

Slip Detection from Friction-Induced Vibrations

As illustrated in FIG. 7, pressure sensor 10 provides easily detected audio frequency signals when skin 16 starts to slip over a contact object. Dynamic information correlated with slip has been shown to lie in frequencies between 50-700 Hz using this approach. This correlates well with what is known of biological slip detection mechanisms. Presence of frequency content within this band is not unique to slip and is also common to other dynamic events such as shock or contact. However, slip events are unique in that they have significantly less spectral information in low frequency bands (0-50 Hz) with respect to these other dynamic events, as shown in FIGS. 7 (A), (B) and (D). In experiments conducted by the inventors, the absence of low-frequency vibrations combined with the presence of high-frequency vibrations tended to occur only during slip when contacting passive objects.

Texture Discrimination from Friction-Induced Vibrations

Figure 8:
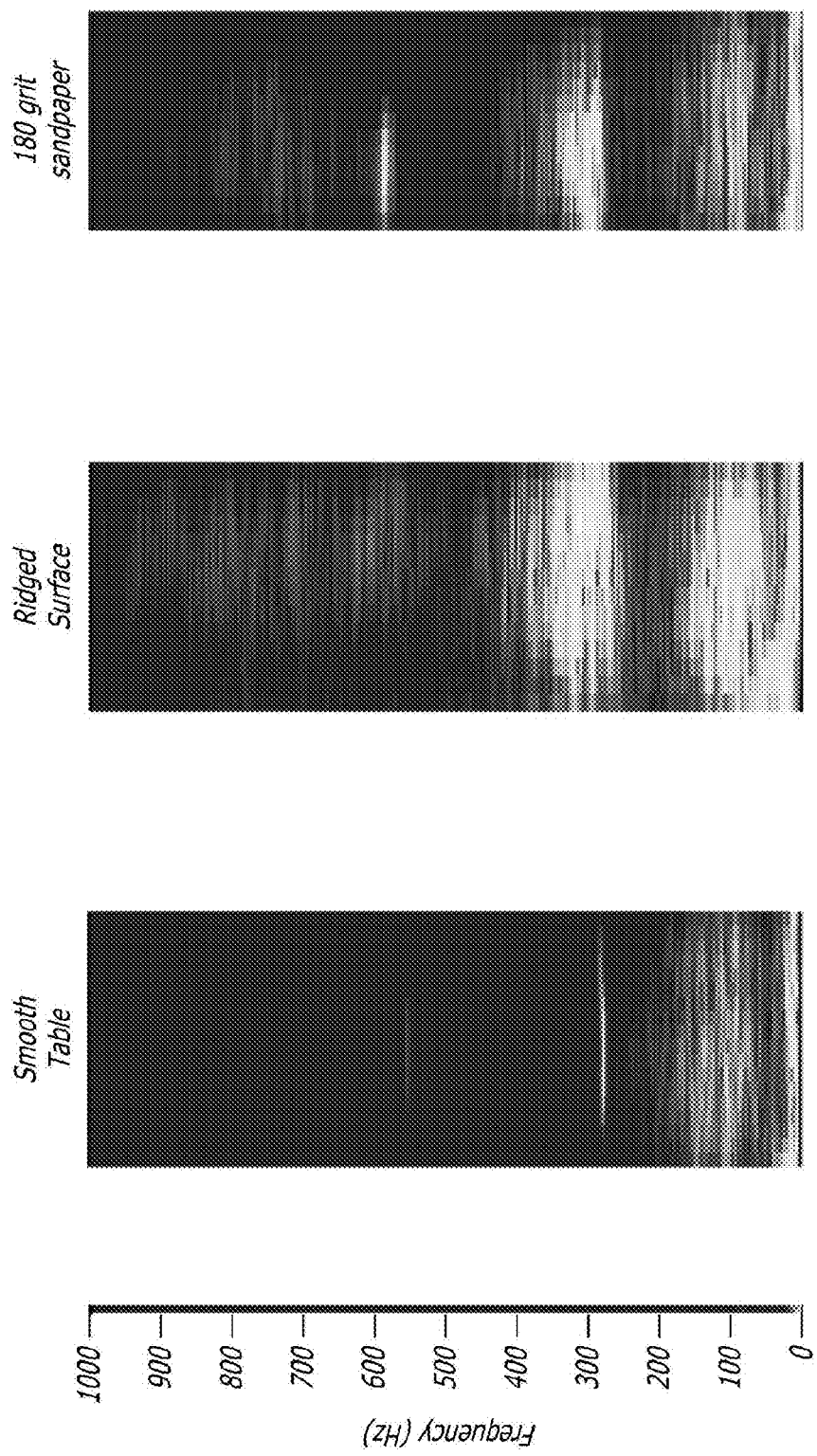
FIG. 8 shows spectrograms of vibration signals used to discriminate textured surfaces, in accordance with exemplary embodiments of the present disclosure.

As noted in FIG. 8, the sensor detects different spectral patterns as it is slid across surfaces of different texture. Thus the sensor is capable of performing texture discrimination tasks when used in conjunction with mechanical means to slide the sensor over textures to be discriminated. Textures have been shown to provide characteristic, repeatable, and identifiable frequency patterns when observed visually on short-time Fourier transform spectrograms or when listened to acoustically. One such signal processing method for extracting this in an automated fashion is to use a short-time Fourier transform with a wide time window. This wide time window is desired to improve the frequency resolution of this transform and improve the ability to discriminate between different textures.

External Texturing to Enhance Friction-Induced Vibrations

To enhance vibration sensing, a regular pattern of ridges 17 similar to those found on human fingers or bumps similar to those found on the fingerpads of raccoons can be incorporated onto the exterior of the elastic skin as depicted in FIG. 9. This would permit for the enhancement of slip detection as well as improve the spectral content used for the determination of texture. This is accomplished due to the inherent structure of elastic structures in this shape. As illustrated in FIGS. 9 (A) and (B), the cantilever structure of the elastic ridges 17 allows for energy to be stored in the bending of these structures as tangential movements are applied. This stored elastic potential produces a force at the contact surface which is maintained by the friction between the ridges 17 and the object being contacted.

As depicted in FIG. 9 (C), when this force exceeds the limits of what can be applied with friction, the ridged structure snaps loose and releases this stored energy which manifests as vibrations in the skin 16. Using mechanisms as described above, these vibrations in the skin 16 are conveyed through the incompressible fluid occupying space 2 and detected by the pressure sensor 10. In the preferred embodiment, these ridges 17 are incorporated into the surface of skin 16 during its manufacture by injection molding into a cavity whose surface includes a negative of the desired ridge pattern. Other methods of forming or attaching ridges 17 or other textural patterns performing a similar function would be obvious to one normally skilled in the art.

Multimodal Signal Processing

It is highly advantageous to combine the three types of sensors described above because the interpretation of signals from one type of sensor may depend on conditions that can be sensed by another type of sensor. The following examples are illustrative but are not intended to be exhaustive.

Impedance Sensing depends on the conductivity of the weakly conductive fluid, which tends to vary directly with the temperature of the fluid. The ambient core temperature detected as $T_{DC}$ can be measured and stabilized via a feedback control algorithm that adjusts the power dissipation of electronic components 9.

Pressure Sensing of vibrations produced by slippage between sensor assembly 100 and the contacting object depend on the location, extent and force of contact between them. These mechanical factors can all be extracted from the Impedance Sensing and used in a feedback control scheme to adjust the nature of the contact to standardized values, much as humans tend to standardize their exploratory movements when trying to identify the texture of an unknown surface.

Temperature Sensing of fluctuations produced by contact with an external object depend on the location, extent and force of contact between sensor assembly 100 and the contacting object. These mechanical factors can all be extracted from the Impedance Sensing and used in a feedback control scheme to adjust the nature of the contact to standardize values, much as humans tend to standardize their exploratory movements when trying to identify an unknown object.

Figure 10:
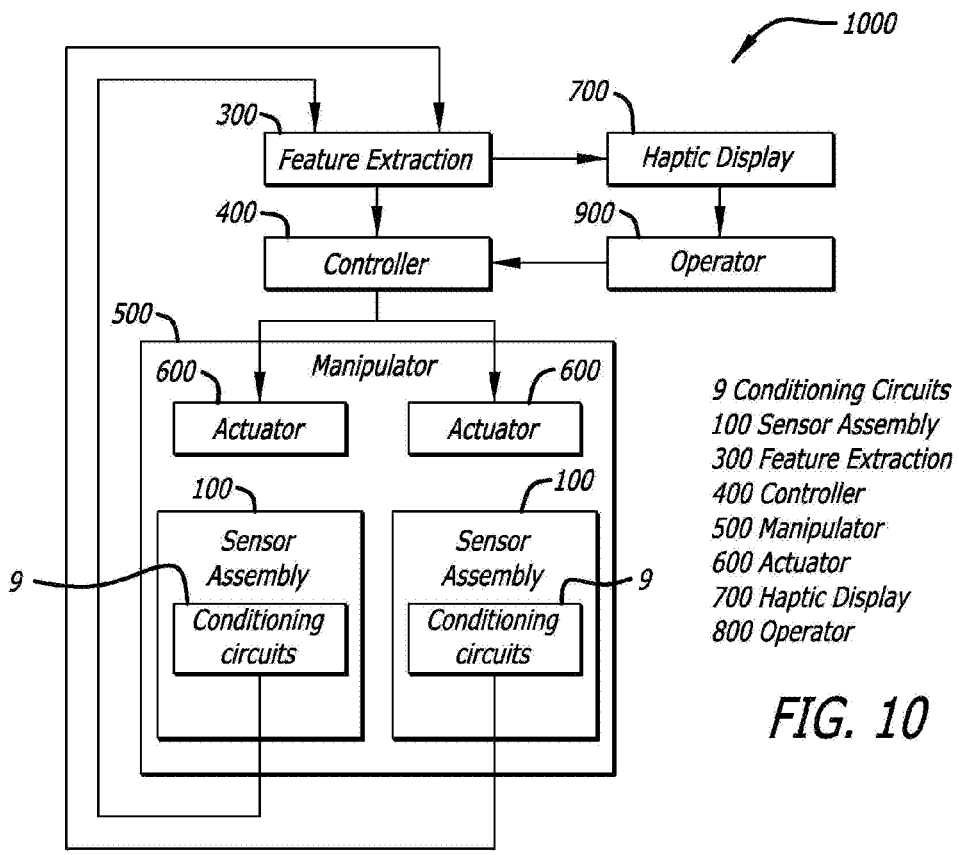
FIG. 10 depicts a block diagram of a system with a manipulator, display, control features, and signal processing features, in accordance with exemplary embodiments of the present disclosure.

FIG. 10 provides a block diagram of a complete system 1000 for control and sensing in a multi-articulated manipulator, in accordance with an exemplary embodiment of the present disclosure. Such a manipulator can include one or more sensor assemblies 100 and one or more powered actuators 600 responsive to a controller 400. Sensor signals from conditioning circuitry 9 in each sensor assembly 100 is transmitted to feature extraction means 300 and may be used to provide sensory feedback to controller 400 according to the requirements of various applications described below. In some applications, the functions performed by controller 400 are partially or wholly under the command of an external operator 900 which may be a human operator or other source of commands such as would be generated in an autonomous robot.

In the case of a human operator 900, sensory information from feature extractor 300 may be advantageously provided to operator 900 by one or more of the many haptic display interfaces now available or under development, including tactors for generating force, vibration and temperature stimuli on an innervated skin surface of the operator 900. Because sensor assembly 100 produces broadband responses to slip and texture that are similar to the signals available to the nervous system from biological tactile receptors, it enables a particularly realistic haptic display as follows. The signals produced by vibration sensing subsystem 205 and pressure sensing subsystem 210 can be combined and applied more or less directly onto the skin of a human operator 800 with a haptic display 700 in order to produce realistic illusions of contact, slip and texture. This would be an advance over vibrotactile information currently delivered from tactors in other applications which typically stimulate at a single frequency with modulated amplitude.

FIGS. 7 and 8 illustrated that slip and texture vibrations are a combination of multiple frequency components and amplitudes. Presenting some or all of the complete set of force, vibration and temperature information sensed by biomimetic sensor assembly 100 to the skin of an operator 900 via a multimodal haptic display 700 would produce more realistic illusions of contact, slip and texture. For human user interaction such as telerobotics and prosthetics, this would be expected to improve haptic perception and dexterous manipulation of objects.

Measurement of Force Vectors for Tactile Feedback Control

Stabilizing a grip may be a function whose requirements and natural strategies are starting to be well understood. In a series of papers by Roland Johansson and coworkers, it has been shown that the grip stability may be affected by an object's size and shape, its mass and weight distribution, and by the coefficient of friction between the fingertips and surface of the object. They have also shown that the central nervous system usually may adjust the grip force so that the friction force developed between the fingertips and the object surface may have a small margin over the external forces that would otherwise cause the object to slip. This strategy may energetically be efficient and suitable for manipulating delicate objects that might be crushed, but it demands continuous tactile sensing and adjustment of grip forces according to the perceived properties of the gripped object.

Each finger's grip force may be adjusted independently based on the sensory information from that finger only and on the local conditions in terms of weight distribution and friction. At least some of this adjustment may occur so rapidly that it appears to be mediated reflexively in the spinal cord rather than via the brain. This is important for prosthetic limbs because it suggests that tactile information can serve a useful function even if communication channels to provide conscious perception of touch to the operator remain nonexistent or primitive, as they are now. Algorithms for the automatic adjustment of grip using biomimetic strategies are likely to be valuable also in telerobotic and purely robotic manipulators.

Figure 11:
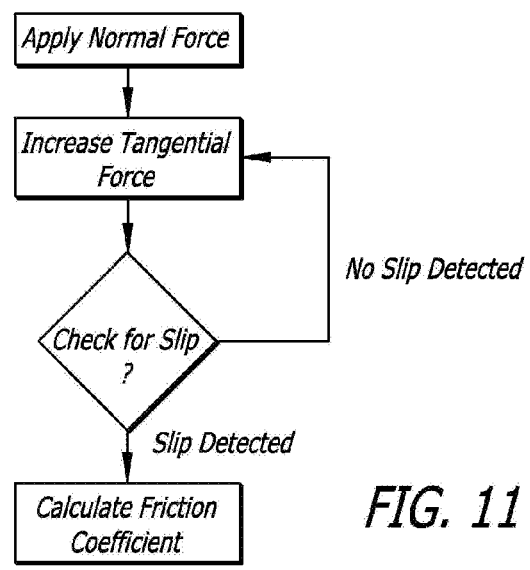
FIG. 11 depicts a flow chart for detecting friction coefficient, in accordance with exemplary embodiments of the present disclosure.

When combined with sensing mechanisms of detecting normal and tangential forces it is possible to use the proposed feature extraction 300 to determine the static friction coefficient as outlined in the flowchart in FIG. 11. This can be accomplished by using an actuator 600 to deliver a fixed amount of normal contact force and a second actuator 600 to gradually increase tangential forces. As the tangential force is increased eventually the sensor will begin to slip along the contact surface. This moment of slip can be determined from the slip-detection feature extraction 300. Just before the moment of slip the ratio of normal to tangential contact forces can be used to calculate the static friction coefficient ($\mu$) from the formula:

$$\mu = \frac{F_{tangential}}{F_{normal}}.$$

This friction coefficient is unique to the coupling of the skin and the object it is touching.

One method of applying the calculated static friction in grip control is outlined in a method proposed by Puchhammer. In this method the required grip force is determined from the tangential forces detected, the friction coefficient ($\mu$) and a safety factor from the following equation $$F_{grip} = \frac{F_{tangential}}{\mu} \times S.F.$$

However, without a suitable method of determining the static friction coefficient between a the gripping surface and an unknown object the assumed friction coefficient can be combined with an unnecessarily high safety factor to maintain grasp on objects with a wide range of friction properties, which is undesirable for the handling of fragile objects.

Figure 12:
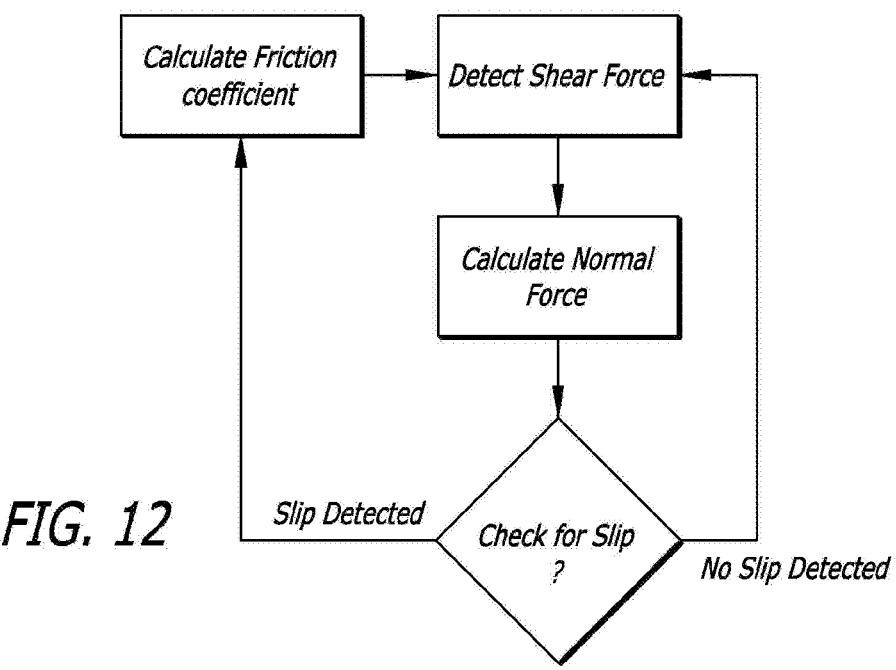
FIG. 12 depicts a flow chart for controlling grip force with a known friction coefficient while also checking for slip, in accordance with exemplary embodiments of the present disclosure.

A secondary method for controlling grip can be implemented by using the slip-detection derived from feature extraction 300 circuitry to constantly check for slip and adjust this static coefficient when slip is detected as depicted in the flow-chart in FIG. 12. This active method of reevaluating the static coefficient can reduce errors that may have occurred due to noise in sensing components and errors in evaluating the static friction coefficient. Because this strategy is more effective at maintaining grip the safety factor used in grip force from the equation above can be reduced which is advantageous for reducing the power required in the gripping actuator.

Figure 13:
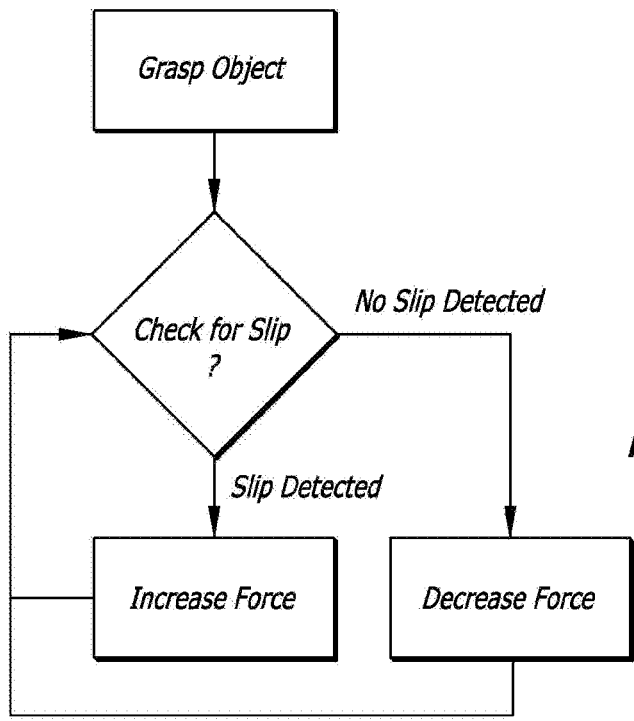
FIG. 13 depicts a flow chart for controlling grip force using only slip detection, in accordance with exemplary embodiments of the present disclosure.
Figure 14:
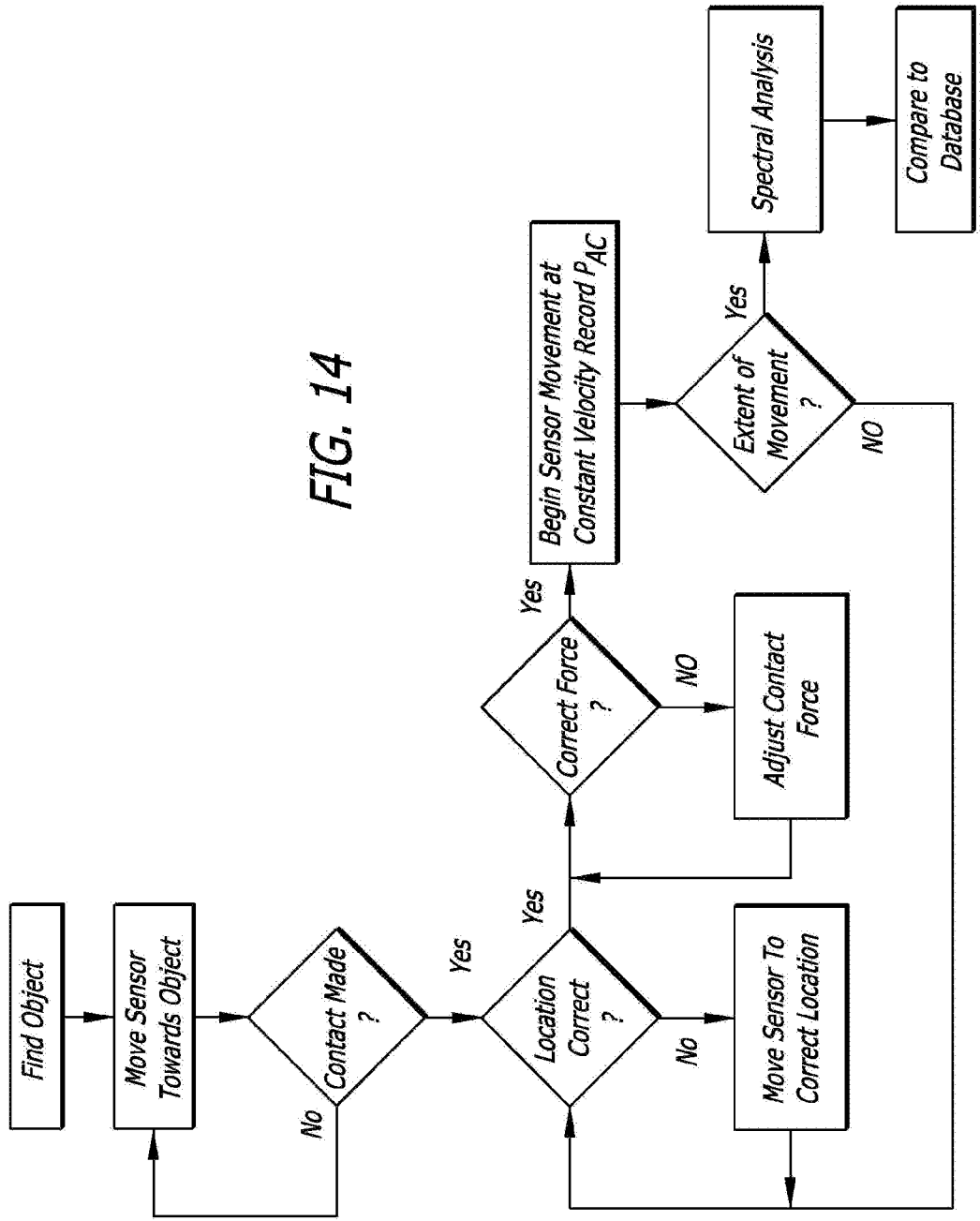
FIG. 14 depicts a flow chart for controlling exploratory movements for discriminating textures using vibration sensing, in accordance with exemplary embodiments of the present disclosure.

An additional method of controlling grip would be to slowly reduce contact force while holding an object and make small increases in force when a slip is detected as depicted in the flow-chart in FIG. 13. This would allow for further improvements in power savings of the mechanical actuator, as the applied grip force would not deviate far from the needed grip force. This is particularly valuable if the actuator is producing more grip force than is needed to maintain grasp. By constantly slowly reducing grip force and checking for slip the grip controller is able to continuously survey if it is possible to maintain grasp of an object with a lower grip force yet maintain grasp when grip force becomes critical, thus reducing power required in the gripping actuator. This also offers the additional advantage of not needing to determine the static friction coefficient as well as not requiring any sensors to detect normal and shear forces as described in the methods presented above.

Robust detection of the onset of slip introduces the possibility for advanced biomimetic grip control algorithms. One proposed method for signal processing to determine slip from feature extraction 300 utilizing the acoustic fluid-pressure data as recorded by pressure sensor 10 is to use a set of band-pass filters and logic that check for the characteristic signatures of slip, which are the existence of high frequency fluid-pressure fluctuations and the relative absence of low-frequency fluid-pressure fluctuations. In order to reduce false positives when using this approach it is desirable to ensure that these criteria are met and maintained for a short period of time, but not excessively long as the object may slip from grasp.

To determine a suitable time for slip-detection confirmation it is useful to compare with delays in biological reflexive grip-adjustments which have been shown to occur after 60-80 ms (Johansson). This biological reaction time is attributed to the transmission delays of sensory and motor neurons (Kandel) as they travel from the fingertips to the spinal cord and back as well as activation times in gripping muscles (Kandel). In comparison with an artificial grip-adjustment system neural transmission cables would be analogous to electric wires, which have virtually non-existent transmission delays, and muscles would be replaced with electromechanical actuators, which also have comparatively negligible activation times. Therefore this 60-80 ms delay as found in the biological system can be used to determine the confidence in slip as detected using the aforementioned methods with no loss in performance when compared to the gold standard of biological reaction times for grip adjustments. Additional methods to accomplish this digitally would to be to use short-time Fourier transforms to analyze the frequency content. When converting to the frequency domain with a time window of this size the frequency resolution is also sufficient to distinguish between low-frequency content and high-frequency content as describe above and required for accurate determination of slip. The ability to automate the detection of slip would allow for advanced biomimetic grip control mechanisms.

Using a sensor with normal and tangential force sensing mechanisms, can permit for biomimetic exploratory movements such as stroking and rubbing typically implemented for texture discrimination tasks. Controlling the contact force and sliding velocity are also beneficial for extracting information to discriminate textures in this fashion. A flowchart for performing such active exploratory movements and interpreting the vibration data thereby obtained in illustrated in FIG. 14.

With the proposed design an object can be located using robotic vision, proximity sensing, or through other means and a mechanical actuator 500 with the sensor assembly 100 attached can be moved towards the object until a contact is detected. Utilizing force and contact information extracted from impedance data using feature extraction 300 commands can be delivered to the controller 400 such that the desired contact force and location are optimized in the sensor assembly 100. Once contact conditions are established the manipulator 500 and sensor assembly 100 can be stroked along the surface while maintaining desired contacting forces and locations while recording spectral content from the pressure sensor 10. At the end of the movement spectral analysis can be performed on the recorded content and it can be compared to a library of materials for texture identification.

Thermal Sensing Temperature Compensation, Impedance-Based Force Sensing

As ionic fluids decrease in temperature, their conductivity tends to decrease. Without temperature compensation, this decrease in conductivity would result in an increase in sensed impedance, which would be interpreted as an increase in force applied between an electrode 6 and the overlying skin 16. Referring to FIG. 1, this problem is overcome by including in core 1 a thermistor 15 with a sufficiently short time constant relative to temperature changes to be measured.

Thermal Characterization of Objects and Interactions Using Heat Flow Sensing

If the sensor assembly 100 is heated, and contacted with an external object, its temperature will change appropriately with the mass, temperature, contact surface area, thermal conductivity and heat capacity of the object. One method of heating the finger would be through the use of a heater. These tend to be bulky and would require a controller for proper operation. Instead of using a heater, the power dissipation energy from the electronics of the control board, 9, could be used to heat the finger. The heat dissipated by the microcontroller 230 depends on its clock frequency and duty cycle of active use as opposed to "sleep states". By utilizing a feedback signal from the thermistor 15, controller 400 can adjust the clock frequency or operation duty cycle of microcontroller 230 to heat the finger to the desired temperature. By keeping track of the amount of energy so applied, it is possible to estimate the ambient temperature around sensor assembly 100 according to principles of thermodynamics that would be obvious to one ordinarily skilled in the art.

When identifying an unknown object during an exploratory behavior, one useful piece of information concerns its thermal properties. For example, objects made of plastics, ceramics and metals tend to have differences in their thermal conductivity and heat capacity. Humans detect such differences as they are reflected in the time-varying rate of temperature change of the skin when it comes into contact with an object at a different temperature than that of the skin. The rate of heat flow between the skin and object will depend on many factors including the amount of pressure the object exerts on the sensor assembly 100. As the pressure increases, the amount of surface area increases, causing an increase in the rate of heat transfer. Thus, humans carefully control the location and amount of force of contact with an object when attempting to extract information about its thermal properties.

Figure 15:
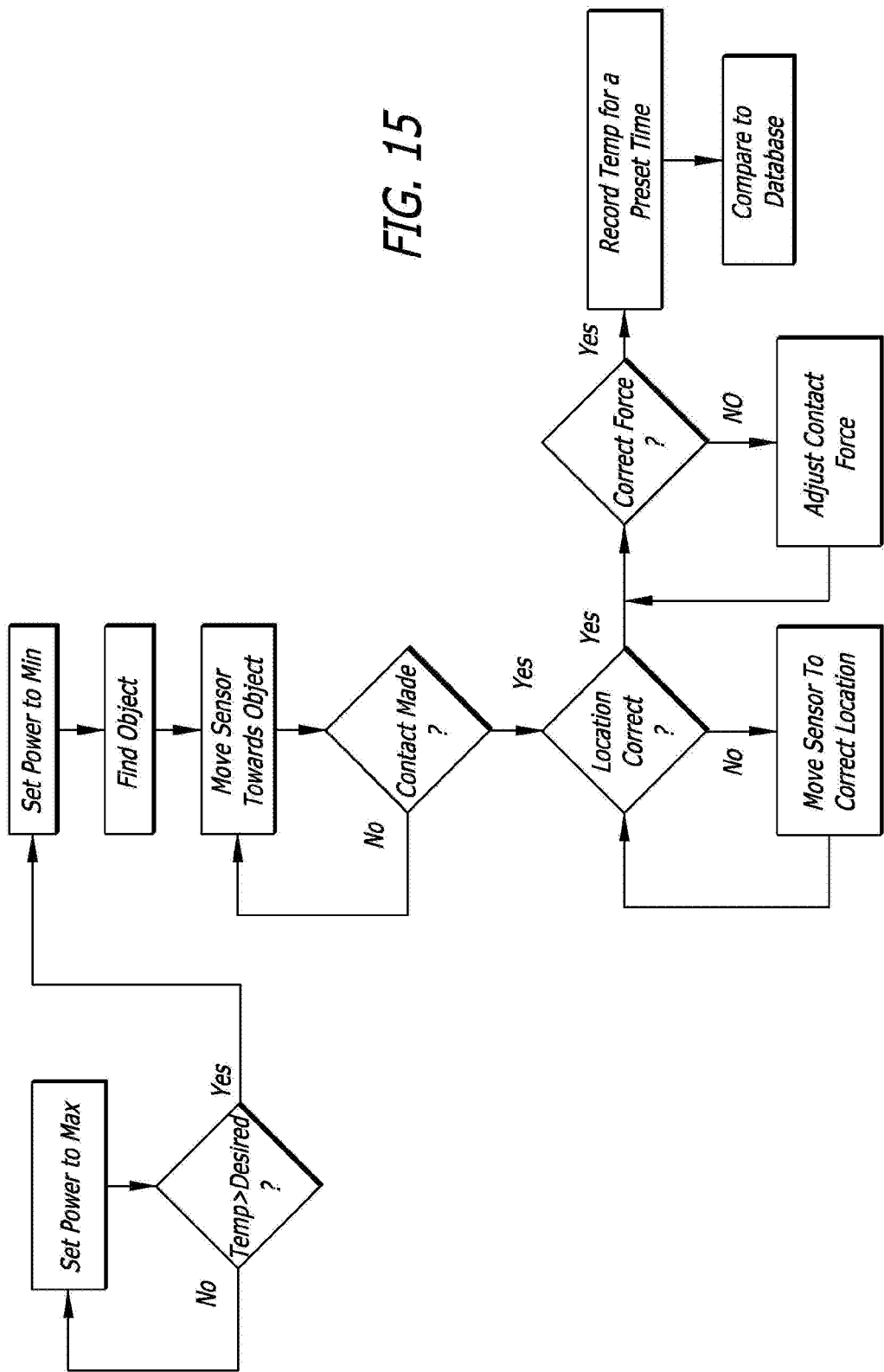
FIG. 15 depicts a flow chart for controlling exploratory movements and signal processing related to characterizing thermal properties of contacted objects, in accordance with exemplary embodiments of the present disclosure.

FIG. 15 illustrates an algorithm for determining thermal properties of objects based on the combination of temperature and force sensing capabilities of exemplary embodiments of the present disclosure. A sensor assembly, e.g., sensor assembly 100 of FIG. 1, can be heated to a certain desired temperature above ambient by using feedback about the current temperature of core from thermistor 15. To do this, controller 400 adjusts the amount of power dissipated as heat by microcontroller 230 by changing its clock frequency or duty cycle. In the event that the measured temperature deviates from the desired value, a negative feedback loop within the heat control software will compensate for this to adjust the temperature back to the desired value. In order to obtain information about the thermal properties of an object, controller 400 initiates an exploratory movement by sending commands to actuators 600. Information about the timing and nature of the contact with the object is obtained from impedance sensing electrodes 6 in order to adjust actuators 600 so that the contact conforms to a standardized exploratory behavior for determining thermal properties of objects. This behavior will generally require that the contact be centered over thermistor 15 and that normal force of contact be sufficient to displace fluid in space 2 allowing skin 16 to make firm contact directly with thermistor 15.

Other opportunities to integrate information from various sensing modalities described herein are intended to be covered by the scope of the present disclosure and would be obvious to someone normally skilled in the art. For example, with reference to FIG. 10, if the sensor assembly 100 is attached to a manipulator 500 capable of handling the object, an estimation of object mass can be made from information that is usually available to controller 400 from position, force, current or voltage sensors related to powered actuators 600, much as humans do when haptically exploring objects. The thermal conductivity of the contacted object can be estimated from the initial slope of the temperature change detected by thermistor 15 and associated signal conditioning circuitry 9. From the mass, thermal conductivity and the change in slope over time of the temperature measured by thermistor 15, it is possible to estimate the heat capacity of the material comprising the object. Thermal properties of materials provide useful information about the identity of the materials and the identity of the object, particularly when combined with visual and other information commonly available from other sensing modalities.

One skilled in the art will appreciate that embodiments and/or portions of embodiments of the present disclosure can be implemented in/with computer-readable storage media (e.g., hardware, software, firmware, or any combinations of such), and can be distributed and/or practiced over one or more networks. Steps or operations (or portions of such) as described herein, including processing functions to derive, learn, or calculate formula and/or mathematical models utilized and/or produced by the embodiments of the present disclosure, can be processed by one or more suitable processors, e.g., central processing units ("CPUs) implementing suitable code/instructions in any suitable language (machine dependent on machine independent).

While certain embodiments have been described herein, it will be understood by one skilled in the art that the techniques (methods, systems, and/or algorithms) of the present disclosure may be embodied in other specific forms without departing from the spirit thereof. Accordingly, the embodiments described herein, and as claimed in the attached claims, are to be considered in all respects as illustrative of the present disclosure and not restrictive.

What is claimed is:

1. A biomimetic tactile sensor system for determining thermal properties of an object comprising:
a rigid core having a surface;
an elastomeric skin surrounding at least a portion of the core, having an inner and outer surface, and configured to form a space for confining fluid between the surface of the portion of the core and the inner surface of the elastomeric skin;
a plurality of electrodes disposed on the surface of the rigid core and configured to be in contact with the fluid in a manner that causes the impedance between at least two of the electrodes to change as the amount of force between the outer surface of the elastomeric skin and the object changes when fluid is within the space between the surface of the portion of the core and the inner surface of the elastomeric skin;
a temperature sensor configured and arranged to detect a temperature of the surface of the rigid core;
a heater configured to heat the temperature sensor above ambient temperature; and
an algorithm configured to determine thermal properties of the object based on the impedance between the at least two of the electrodes and the slope of temperature change detected by the temperature sensor.

2. The system of claim 1, wherein the detection circuitry is configured and arranged to provide as an output a control signal for position and/or force based on the impedance.

3. The system of claim 1, further comprising a fluid disposed within the space, wherein the fluid comprises an electrically conductive liquid.

4. The system of claim 1, wherein the temperature sensor comprises a thermistor.

5. The system of claim 1, wherein the heater includes a microprocessor configured and arranged to have power dissipation be controlled by software.

6. The system of claim 1, wherein the temperature sensed by the temperature sensor is used to control the heater.

7. A biomimetic tactile sensor system comprising:
a rigid core having a surface and a plurality of electrodes disposed on the surface, wherein the electrodes are configured and arranged to detect impedance changes of a fluid;
an elastomeric skin surrounding at least a portion of the core and having an inner and outer surface, and configured and arranged to form a space for confining a fluid between the surface of the core and the inner surface, wherein the inner surface of the skin comprises a plurality of asperities; and
detection circuitry configured and arranged to detect changes in electrical impedance of the fluid between at least one of the electrodes caused by force that is exerted on the elastomeric skin,
wherein the asperities are configured to cause the electrical impedance to increase in response to an increase in the force that is exerted on the elastomeric skin after the force reaches a level that causes the elastomeric skin to come in contact with the at least one electrode.

8. The system of claim 7, wherein the detection circuitry is configured and arranged to provide as an output a control signal for controlling position and/or force based on the detected changes in impedance.

9. The system of claim 7, further comprising a fluid disposed within the space, wherein the fluid comprises an electrically conductive liquid.

10. The system of claim 7, wherein the asperities comprise a repeated pattern.

11. The system of claim 7, wherein the asperities comprise pyramidal protrusions from the inner surface of the skin.

12. The system of claim 7, wherein the asperities comprise columnar protrusions from the inner surface of the skin.

13. The system of claim 7, wherein the asperities are cylindrical asperities.

14. The system of claim 13, wherein the asperities are about 0.25 mm tall and 0.25 mm in diameter.

15. The system of claim 14, wherein the asperities are about 0.5 mm apart and are configured and arranged in a regular square grid pattern.

16. The sensor of claim 7, wherein the elastomeric skin comprises silicone or polyurethane.

17. The sensor of claim 7, wherein the elastomeric skin includes bumps or ridges on the outer surface.

18. A biomimetic tactile sensor system comprising:
a rigid core having a surface;
an elastomeric skin surrounding at least a portion of the core and having an inner and outer surface, and configured and arranged to form a space for confining a fluid between the surface of the core and the inner surface;
one or more sensors configured and arranged to detect a physical characteristic of the fluid within the sensor system;
a collar seal for sealing the skin against the core in a fluid tight configuration.

19. The system of claim 18, further comprising a fluid disposed within the space, wherein the fluid comprises an electrically conductive liquid.

20. The system of claim 18, further comprising an inflation port disposed within the skin.

21. The system of claim 18, wherein the collar seal comprises a self-compressing edge seal that is molded as an integral part of the skin for simplifying removal and replacement of the skin for field service.

22. The system of claim 21, wherein the collar seal further comprises a groove configured and arranged around a circumference of a portion of the core.

23. A biomimetic tactile sensor system comprising:
a rigid core having a surface;
an elastomeric skin surrounding at least a portion of the core and having an inner and outer surface, and configured and arranged to form a space for confining a fluid between the surface of the core and the inner surface;
one or more sensors configured and arranged to detect a physical characteristic of the fluid within the sensor system; and
a resealable inflation port disposed within the skin for filling the space with fluid.

24. The system of claim 23, further comprising conditioning circuitry configured and arranged to receive and condition electrical signals received from the one or more sensors.

25. The system of claim 23, further comprising a fluid disposed within the space, wherein the fluid comprises an electrically conductive liquid.

26. The system of claim 23, wherein the resealable inflation port comprises a plate with an aperture for receiving a needle.

27. The system of claim 26, wherein the resealable inflation port comprises a thickened portion of the skin corresponding to the location of the plate, wherein when the plate is secured to the skin, compressive forces exist in the thickened portion.

28. The system of claim 26, wherein either or both of the plate and core include one or more rigid surfaces that are angled for producing resultant forces within the thickened portion of skin producing compression perpendicular to an axis of a needle inserted through the skin for filling the space.

* * * * *